United States Patent
Zhang et al.

(10) Patent No.: US 11,095,922 B2
(45) Date of Patent: Aug. 17, 2021

(54) GEOMETRY TRANSFORMATION-BASED ADAPTIVE LOOP FILTERING

(71) Applicant: QUALCOMM Incorporated, San Diego, CA (US)

(72) Inventors: Li Zhang, San Diego, CA (US); Wei-Jung Chien, San Diego, CA (US); Xin Zhao, San Diego, CA (US); Yi-Wen Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 15/665,492

(22) Filed: Aug. 1, 2017

(65) Prior Publication Data

US 2018/0041779 A1 Feb. 8, 2018

Related U.S. Application Data

(60) Provisional application No. 62/370,179, filed on Aug. 2, 2016.

(51) Int. Cl.
*H04N 19/82* (2014.01)
*H04N 19/157* (2014.01)
(Continued)

(52) U.S. Cl.
CPC .......... *H04N 19/82* (2014.11); *H04N 19/117* (2014.11); *H04N 19/122* (2014.11);
(Continued)

(58) Field of Classification Search
CPC .............................. H04N 19/82; H04N 19/117
(Continued)

(56) References Cited

U.S. PATENT DOCUMENTS 9,807,403 B2   10/2017   Chong et al.
2004/0161035 A1   8/2004   Wedi
(Continued)

FOREIGN PATENT DOCUMENTS

CN   103096057 A   5/2013
CN   104683819 A   6/2015
(Continued)

OTHER PUBLICATIONS

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pp.
(Continued)

*Primary Examiner* — Jerry T Jean Baptiste
(74) *Attorney, Agent, or Firm* — Arent Fox, LLP

(57) ABSTRACT

The present disclosure provides various techniques related to adaptive loop filtering (ALF), and particular to geometry transformation-based ALF (GALF). In an aspect, a method for decoding video data includes receiving an encoded bitstream having coded video data from which reconstructed video units are generated, identifying multiple filter supports for the reconstructed video units, and filtering the reconstructed video units using the respective multiple filter supports to produce a decoded video output. Another method includes enabling block-level control of ALF of chroma components for the reconstructed video units, performing, for the reconstructed video units, the block-level ALF for the chroma components when ALF is enabled for one video block and skip performing the block-level ALF for the chroma components when ALF is disabled for another video block, and generating, based on the enabled block-level control of ALF, a decoded video output. Related
(Continued)

devices, means, and computer-readable medium are also described.

58 Claims, 24 Drawing Sheets

(51) Int. Cl.

| | |
|---|---|
| *H04N 19/136* | (2014.01) |
| *H04N 19/176* | (2014.01) |
| *H04N 19/186* | (2014.01) |
| *H04N 19/117* | (2014.01) |
| *H04N 19/122* | (2014.01) |
| *H04N 19/147* | (2014.01) |
| *H04N 19/17* | (2014.01) |
| *H04N 19/18* | (2014.01) |

(52) U.S. Cl.
CPC ......... *H04N 19/136* (2014.11); *H04N 19/147* (2014.11); *H04N 19/157* (2014.11); *H04N 19/17* (2014.11); *H04N 19/176* (2014.11); *H04N 19/18* (2014.11); *H04N 19/186* (2014.11)

(58) Field of Classification Search
USPC .......................................................... 375/240
See application file for complete search history.

(56) References Cited

U.S. PATENT DOCUMENTS

| | | | | |
|---|---|---|---|---|
| 2008/0247675 | A1* | 10/2008 | Magai ................. | G06K 9/4671 382/305 |
| 2011/0228843 | A1* | 9/2011 | Narroschke ........... | H04N 19/61 375/240.03 |
| 2011/0274158 | A1* | 11/2011 | Fu ........................ | H04N 19/439 375/240.02 |
| 2012/0051438 | A1* | 3/2012 | Chong .................. | H04N 19/82 375/240.25 |
| 2012/0177104 | A1 | 7/2012 | Budagavi et al. | |
| 2013/0058421 | A1 | 3/2013 | Zheng et al. | |
| 2013/0266059 | A1* | 10/2013 | Chong .................. | H04N 19/169 375/240.02 |
| 2014/0098890 | A1 | 4/2014 | Sermadevi et al. | |
| 2015/0350648 | A1 | 12/2015 | Fu et al. | |
| 2015/0365703 | A1* | 12/2015 | Puri ...................... | H04N 19/17 375/240.24 |
| 2018/0041778 | A1 | 2/2018 | Zhang et al. | |
| 2018/0295363 | A1* | 10/2018 | Nam ..................... | H04N 19/85 |

FOREIGN PATENT DOCUMENTS

| | | |
|---|---|---|
| CN | 105306957 A | 2/2016 |
| CN | 105791877 A | 7/2016 |
| EP | 2625860 A1 | 8/2013 |
| WO | 2012045270 A1 | 4/2012 |
| WO | WO-2013059461 A1 | 4/2013 |

OTHER PUBLICATIONS

Chen J., et al., "Coding Tools investigation for Next Generation Video Coding based on HEVC," Optomechatronic Micro/Nano Devices and Components III: Oct. 8-10, 2007, Lausanne, Switzerland; [Proceedings of SPIE, ISSN 0277-786X], SPIE, Bellingham, Wash, vol. 9599, Sep. 22, 2015, pp. 95991B-1-95991B-9, XP060060836, DOI: 10.1117/12.2193681, ISBN: 978-1-62841-730-2, the whole document.
Chen Q., et al., "Classified Quadtree-based Adaptive Loop Filter," IEEE International Conference on Multimedia and Expo (ICME), 2011, pp. 1-6.
Chujoh, et al., "Quadtree-Based Adaptive Loop Filter," ITU-T SG16 Contribution, COM 16-C181-E, Geneva, Jan. 2009, 4 pp.
Intel, "Adaptive (Wiener) Filter for Video Compression," International Telecommunication Union, Study Group 16—Contribution 437, COM 16-C 437 R1-E, Apr. 2008, 7 Pages.
ISO/IEC JTC1/SC29/WG11, "Proposed Revised Requirements for a Future Video Coding Standard," MPEG doc.M36183, Warsaw, Poland, Jun. 2015, 12 pages.
Karczewicz M., et al., "Improvements on Adaptive Loop Filter", 2. JVET Meeting, Feb. 20, 2016-Feb. 26, 2016, San Diego, (The Joint Video Exploration Team of ISO/IEC JTC1/SC29/WG11 and ITU-T SG.16 ), No. JVET-B0060-v2, Feb. 20, 2016 (Feb. 20, 2016), XP030150068, URL: http://phenix.int-evry.fr/jvet/.
Karczewicz M., et al., "EE2.5: Improvements on adaptive loop filter," Joint Video Exploration Team (JVET) of ITU-T SG 16 WP 3 and ISO/IEC JTC 1/SC 29/WG 11, 3rd Meeting: Geneva, CH, Document: JVET-C0038, May 26-Jun. 1, 2016, pp. 1-4.
Karczewicz M., et al., "Geometry Transformation-based Adaptive In-Loop Filter," Picture Coding Symposium, Dec. 4-7, 2016, pp. 1-5.
Karczewicz, M., et al., "Video Coding Technology Proposal by Qualcomm Inc.", Joint Collaborative Team on Video Coding (JCT-VC) of ITU-T SG16 WP3 and ISO/IEC JTC1/SC29/WG11, Document: JCTVC-A121, Status: Input Document to JCT-VC, Apr. 2010, pp. 1-24.
Suehring K., et al., "JEVT common test conditions and software reference configurations", 2nd Meeting, Feb. 20-26, 2016, San Diego, USA; Joint Collaborative Video Exploration Team (JVET) of ITU-T-SG 16 WP 3 and ISO/IEC JTC 1/SC 29/WG 11, JVET-B1010, Apr. 4, 2016, 4 pp.
Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.
Toshiba, "Adaptive Loop Filter for Improving Coding Efficiency", International Telecommunication Union, Study Group 16—Contribution 402, COM 16-C 402-E, Apr. 2008, 3 Pages.
Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.
Wiegand, T., et al., "WD3: Working Draft 3 of High-Efficiency Video Coding," Document JCTVC-E603, 5th Meeting: Geneva, CH, Mar. 16-23, 2011, 160 pages.
Wittmann S., et al., "Transmission of Post-Filter Hints for Video Coding Schemes", IEEE International Conference on Image Processing, Sep. 16, 2007-Oct. 19, 2007, 4 pages.
Zhang X., et al., "Low-Rank based Nonlocal Adaptive Loop Filter for High Efficiency Video Compression," IEEE Transactions on Circuits and Systems for Video Technology, DOI 10.1109/TCSVT. 2016.2581618, 2016, pp. 1-12.
Chujoh T., et al., "Specification and experimental results of quadtree-based adaptive loop filter", 37. VCEG meeting, Apr. 15, 2009 (Apr. 15, 2009), XP002675788, Yokohama Retrieved from the Internet: URL:http://wftp3.itu.int/av-arch/video-site/0904_Yok/VCEG-AK22. zip [retrieved on May 11, 2012], 11 pages.
International Search Report and Written Opinion—PCT/US2017/045035—ISA/EPO—dated Dec. 5, 2017 (23 pages).
Kossentini F., et al., "Adaptive Loop Filtering Using Two Filter Shapes", 5 th JCT-VC Meeting; 96th MPEG Meeting; Mar. 16, 2011-Mar. 23, 2011; Geneva; (Joint Collaborative Team on Video Coding of ISO/IEC JTC1/SC29/WG11AND ITU-T SG.16); URL: http://wftp3.itu.int/av-arch/jctvc-site/,,No. JCTVC-E342, Mar. 11, 2011, XP030008848, ISSN: 0000-0005, 7 pages.
Partial International Search Report—PCT/US2017/045035—ISA/EPO—dated Oct. 26, 2017 (19 pages).
Alshina E., et al., "Non-CE1: On SAO Type Sharing Between Color Component", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL:

(56) References Cited

OTHER PUBLICATIONS http://wftp3.itu.int/av-arch/jctvc-site/,, No. JCTVC-I0590, May 2, 2012 (May 2, 2012), XP030112353, pp. 1-10.

Kossentini F., et al., "CE8 Subtest 5: Adaptive Loop Filtering of Luminance and Chrominance Samples Using Same Filtering Shape, Structure and Map", JCTVC-F042, 97. MPEG Meeting; Jul. 18, 2011-Jul. 22, 2011; Torino; (Motion Picture Expert Group or ISO/IEC JTC1/SC29/WG11), No. m20447, Jul. 12, 2011 (Jul. 12, 2011), XP030049011, pp. 1-11.

Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

* cited by examiner

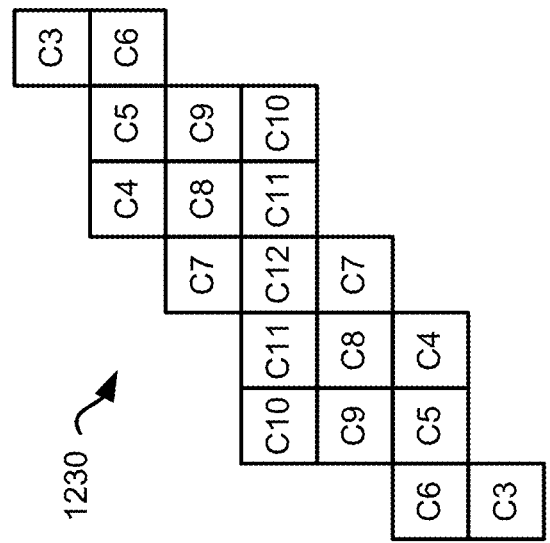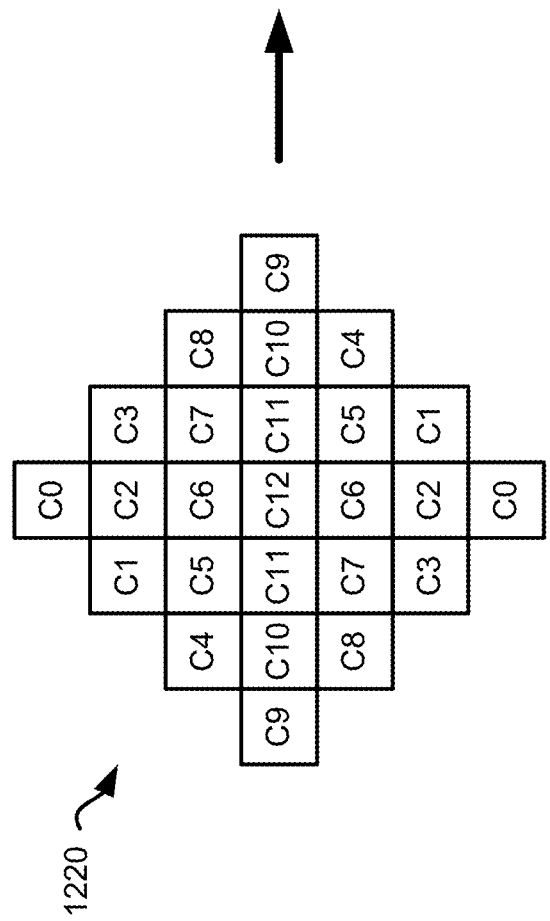
FIG. 12B

GEOMETRY TRANSFORMATION-BASED ADAPTIVE LOOP FILTERING

PRIORITY

The present application for patent claims priority to Provisional Application No. 62/370,179 entitled "GEOMETRY TRANSFORMATION-BASED ADAPTIVE LOOP FILTERING" filed on Aug. 2, 2016, which is assigned to the assignee hereof and hereby expressly incorporated by reference herein for all purposes.

BACKGROUND

This present disclosure is related to various techniques related to adaptive loop filter (ALF), and more specifically, to improvements in geometry transformation-based ALF (GALF) in the context of advanced video codecs.

ALF for image/video coding has attracted significant interest because of the improvements it can provide in coding performance. ALF is used to minimize the mean square error (e.g., distortion) between original samples and decoded samples by using Wiener-based adaptive filters. Samples in a picture are classified into categories and the samples in each category are filtered with their associated adaptive filter. GALF provides some improvements to ALF, particularly by the introduction of geometric transformations to be applied to the samples in a filter support depending on the orientation of the gradient of the reconstructed samples (before adaptive loop filtering is applied).

Current implementations of ALF or GALF can have several limitations. For example, for each frame (e.g., for each video unit), when ALF or GALF is enabled, only one of the pre-defined filter supports is typically selected and signaled. In addition, current geometric transformations only consider a transposition of 90 degree changes. Moreover, classification is generally dependent on the gradients which is good at capturing the directional information. However, cases where a video block in a video unit has no obvious direction, but with progressive changes along the rows, or when a video block has a smooth region and pixels within the video block have quite similar sample values, cannot be differentiated in current ALF or GALF designs. Finally, in current ALF or GALF design, for both chroma components (e.g., Cb, Cr) in a picture, filter support is limited to a single (e.g., 5×5) diamond-shaped filter support and luma component information is not used for chroma filtering.

Accordingly, there is a need for techniques that provide further gains in the performance of ALF and GALF (e.g., coding gains) by addressing limitations described above.

SUMMARY

This present disclosure is related to various techniques related to adaptive loop filter (ALF), and more specifically, to improvements in geometry transformation-based ALF (GALF) in the context of advanced video codecs, such as high efficiency video coding (HEVC) or the next generation of video standards. These improvements include enhancements in geometry transformations, the use of multiple filter supports, and improve filtering of chroma components.

In one aspect, a method for decoding video data is described, the method including receiving an encoded bitstream having coded video data from which reconstructed video units are generated, identifying multiple filter supports for each of the reconstructed video units, and filtering each of the reconstructed video units using the respective multiple filter supports to produce a decoded video output.

In another aspect, a device or apparatus for decoding video data is described, the device including a memory configured to store instructions, and a processor configured to execute the instructions to receive an encoded bitstream having coded video data from which reconstructed video units are generated, to identify multiple filter supports for each of the reconstructed video units, and to filter each of the reconstructed video units using the respective multiple filter supports to produce a decoded video output.

In another aspect, a method for encoding video data is described, the method including identifying multiple filter supports for each of multiple reconstructed video units, filtering each of the reconstructed video units using the respective multiple filter supports to produce a decoded video output, and applying the decoded video output to a prediction process.

In another aspect, a device for encoding video data is described, the device including a memory configured to store instructions, and a processor configured to execute the instructions to identify multiple filter supports for each of the reconstructed video units, to filter each of the reconstructed video units using the respective multiple filter supports to produce a decoded video output, and to apply the decoded video output to a prediction process.

In another aspect, a method for decoding video data is described, the method including receiving an encoded bitstream having coded video data from which reconstructed video units are generated, enabling block-level control of adaptive loop filtering (ALF) of chroma components for each of the reconstructed video units, performing, for the reconstructed video units, the block-level ALF for the chroma components when ALF is enabled for one video block and skip performing the block-level ALF for the chroma components when ALF is disabled for another video block, and generating, based on the enabled block-level control of ALF, a decoded video output.

In another aspect, a method for decoding video data is described, the method including receiving an encoded bitstream having coded video data from which reconstructed video units are generated, and performing filtering of chroma component samples for each of the reconstructed video units using one or more luma component samples to produce a decoded video output.

In another aspect, device for decoding video data is described, the device including a memory configured to store instructions, and a processor configured to execute the instructions to receive an encoded bitstream having coded video data from which reconstructed video units are generated, to enable block-level control of ALF of chroma components for each of the reconstructed video units, to perform, for the reconstructed video units, the block-level ALF for the chroma components when ALF is enabled for one video block and skip performing the block-level ALF for the chroma components when ALF is disabled for another video block, and to generate, based on the enabled block-level control of ALF, a decoded video output.

In another aspect, a device for decoding video data is described, the device including a memory configured to store instructions, and a processor configured to execute the instructions to receive an encoded bitstream having coded video data from which reconstructed video units are generated, and to filter chroma component samples for each of the reconstructed video units using one or more luma component samples to produce a decoded video output.

In another aspect, a method for encoding video data is described, the method including enabling block-level control of ALF of chroma components for each of the reconstructed video units, performing, for the reconstructed video units, the block-level ALF when ALF is enabled for one video block an skip performing the block-level ALF for the chroma components when ALF is disabled for another video block, and generating, based on the enabled block-level control of ALF, a decoded video output that is applied to a prediction process.

In another aspect, a method for encoding video data is described, the method including filtering chroma component samples for each of reconstructed video units using one or more luma component samples to produce a decoded video output, and applying the decoded video output to a prediction process.

In another aspect, a device for encoding video data is described, the device including a memory configured to store instructions, and a processor configured to execute the instructions to enable block-level control of adaptive loop filtering (ALF) of chroma components for each of the reconstructed video units, to perform, for the reconstructed video units, the block-level ALF when ALF is enabled for one video block an skip performing the block-level ALF for the chroma components when ALF is disabled for another video block, and to generate, based on the enabled block-level control of ALF, a decoded video output that is applied to a prediction process.

In another aspect, a device for encoding video data is described, the device including a memory configured to store instructions, and a processor configured to execute the instructions to filter chroma component samples for each of reconstructed video units using one or more luma component samples to produce a decoded video output, and to apply the decoded video output to a prediction process.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 10 is a diagram illustrating an example of a 5×5 diamond-shaped filter support, in accordance with various aspects of the disclosure.

FIGS. 11A-11C are diagrams illustrating examples of geometry transformations, in accordance with various aspects of the disclosure.

FIGS. 12A and 12B are diagrams illustrating examples of geometric transformations for strong diagonal directions, in accordance with various aspects of the disclosure.

DETAILED DESCRIPTION

Figure 1:
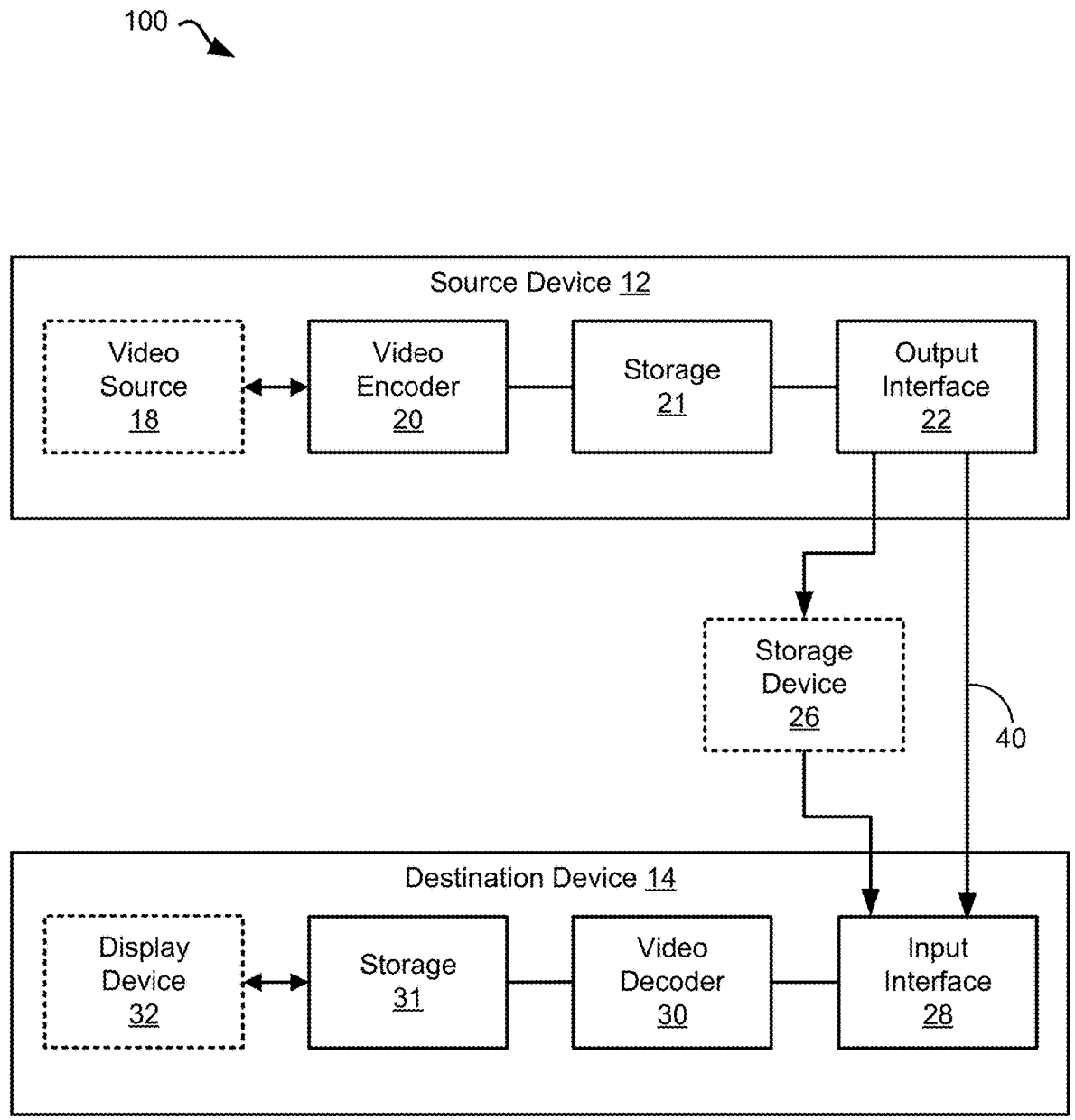
FIG. 1 is a block diagram illustrating an example of a source or encoding device and a destination or decoding device, in accordance with various aspects of the disclosure.

Certain aspects and embodiments of this disclosure are provided below. For example, various aspects related to enhancements to ALF and GALF are described, including expanding geometric transformations, more flexible use of multiple filter supports, and improvements in chroma filtering. These enhancements to ALF and GALF are intended to provide coding gains in the context of advanced video codecs, such as extensions of HEVC or the next generation of video coding standards. Some of these aspects may be applied independently and some of them may be applied in combination as would be apparent to those of skill in the art. In the following description, for the purposes of explanation, specific details are set forth in order to provide a thorough understanding of the disclosure. It is to be understood by one of ordinary skill in the art that the various aspects of the proposed ALF and GALF techniques described in this disclosure may be practiced without these specific details. For example, circuits, systems, networks, processes, and other components may be shown as components in block diagram form in order not to obscure the various aspects in unnecessary detail. In other instances, well-known circuits, processes, algorithms, structures, and techniques may be shown without unnecessary detail in order to avoid obscuring the various aspects being described.

As described above, current implementations of ALF or GALF can have several limitations. For example, for each frame (e.g., for each video unit), when ALF or GALF is enabled, only one of the pre-defined filter supports is typically selected and signaled. If more filter supports could be selected based on local characteristics, higher coding gains can be expected. In addition, current geometric transformations only consider a transposition of 90 degree changes. Since there is no need to signal the geometry transformation index and only one set of filter coefficients needs to be signaled for existing (e.g., four) geometry transformations, additional geometry transformations may also bring additional coding gains. Moreover, classification is generally dependent on the gradients which is good at capturing the directional information. However, cases where a video block in a video unit has no obvious direction, but with progressive changes along the rows, or when a video block has a smooth region and pixels within the video block have quite similar sample values, cannot be differentiated in current ALF or GALF designs. Finally, in current ALF or GALF design, for both chroma components (e.g., Cb, Cr) in a picture, filter support is limited to a single (e.g., 5×5) diamond-shaped filter support and luma component information is not used for chroma filtering. More coding gains can be expected for chroma components when allowing more flexible filter supports and/or when luma component information is also considered. To address these limitations, and as discussed above, this disclosure describes various enhancements to ALF and GALF, including expanding geometric transformations, more flexible use of multiple filter supports, and improvements in chroma filtering.

FIG. 1 is a block diagram illustrating an example of a system 100. Aspects of the system 100 may be used in connection with the various techniques described herein for ALF and GALF. The system 100 may include a source or encoding device 12 and a destination or decoding device 14. It is to be understood, however, that one device may include both a source device 12 and a destination device 14 (see e.g., FIG. 3). The source device 12 and/or the destination device 14 may include or may be part of an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device 12 and the destination device 14 may include one or more wireless transceivers for wireless communications. The various coding techniques described herein are applicable to video coding in various multimedia applications, including streaming video transmissions (e.g., over the internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, virtual reality, and/or video telephony.

The source device 12 as described above may include a video source 18, a video encoder 20, a storage 21, and a output interface 22. Alternatively, the video source 18 can be separate from the source device 12. The destination device 14 (which can also be referred to as a receiving device) as described above may include an input interface 28, a video decoder 30, a storage 31, and a display device 32. Alternatively, the display device 32 can be separate from the destination device 14. The display device 32 as described herein may display video data to a user, and may comprise any of a variety of display devices such as a cathode ray tube (CRT), a liquid crystal display (LCD), a plasma display, an organic light emitting diode (OLED) display, or another type of display device.

The source device 12 can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Another coding standard, High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol. Further, investigation of new coding tools for screen-content material such as text and graphics with motion has been conducted, and technologies that improve the coding efficiency for screen content have been proposed. A H.265/HEVC screen content coding (SCC) extension is being developed to cover these new coding tools.

The video source 18 may provide the video data to the source device 12. The video source 18 may be part of the source device, or may be part of a device other than the source device 12. The video source 18 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 18 may include one or more input pictures or frames. A picture or frame is a still image that is part of a sequence of images that form a video. A picture or frame, or a portion thereof, may be referred to as a video image or a video unit. The video encoder 20 (or encoder) of the source device 12 encodes the video data to generate an encoded video bitstream (e.g., a sequence of encoded video images). In some examples, an encoded video bitstream (or "bitstream") is a series of one or more coded video sequences. A coded video sequence (CVS)

includes a series of access units (AUs) starting with an AU that has a random access point picture in the base layer and with certain properties up to and not including a next AU that has a random access point picture in the base layer and with certain properties. An HEVC bitstream, for example, may include one or more CVSs including data units called network abstraction layer (NAL) units.

The video encoder 20 generates coded representations of pictures by partitioning each picture into multiple slices. A slice can be independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. Luma generally refers to the level of brightness of a sample and is considered achromatic. Chroma, on the other hand, refers to a color level and carries color information. Luma and chroma values for a particular pixel location (e.g., pixel values) may be provided using a certain bit depth. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs). The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). Once the pictures of the video data are partitioned into CUs, the video encoder 20 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, inter-prediction using uni-prediction may be performed, in which case each prediction block can use one motion compensated prediction signal, and P prediction units are generated. In some examples, inter-prediction using bi-prediction may be performed, in which case each prediction block uses two motion compensated prediction signals, and B prediction units are generated.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The video encoder 20 in the source device 12 may then perform transformation and quantization. For example, following prediction, the video encoder 20 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a transform unit (TU) may be used for the transform and quantization processes implemented by the video encoder 20. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the video encoder 20 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The video encoder 20 may form the TUs including the residual data for the CU, and may then transform the TUs to produce transform coefficients for the CU.

The video encoder 20 can implement ALF or GALF, and can be configured to perform one or more of the enhancements described herein for ALF and GALF. For example, the video encoder 20 can implement various techniques, including expanding geometric transformations, more flexible use of multiple filter supports, and improvements in chroma filtering.

The video encoder 20 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded bitstream includes quantized transform coefficients, prediction information (e.g., prediction modes, motion vectors, or the like), partitioning information, and any other suitable data, such as other syntax data. The different elements of the coded bitstream may then be entropy encoded by the video encoder 20. In some examples, the video encoder 20 may utilize a predefined scan order to scan the quantized transform coefficients to produce a serialized vector that can be entropy encoded. In some examples, video encoder 20 may perform an adaptive scan. After scanning the quantized transform coefficients to form a one-dimensional vector, the video encoder 20 may entropy encode the one-dimensional vector. For example, the video encoder 20 may use context adaptive variable length coding, context adaptive binary arithmetic coding, syntax-based context-adaptive binary arithmetic coding, probability interval partitioning entropy coding, or another suitable entropy encoding technique.

Figure 3:
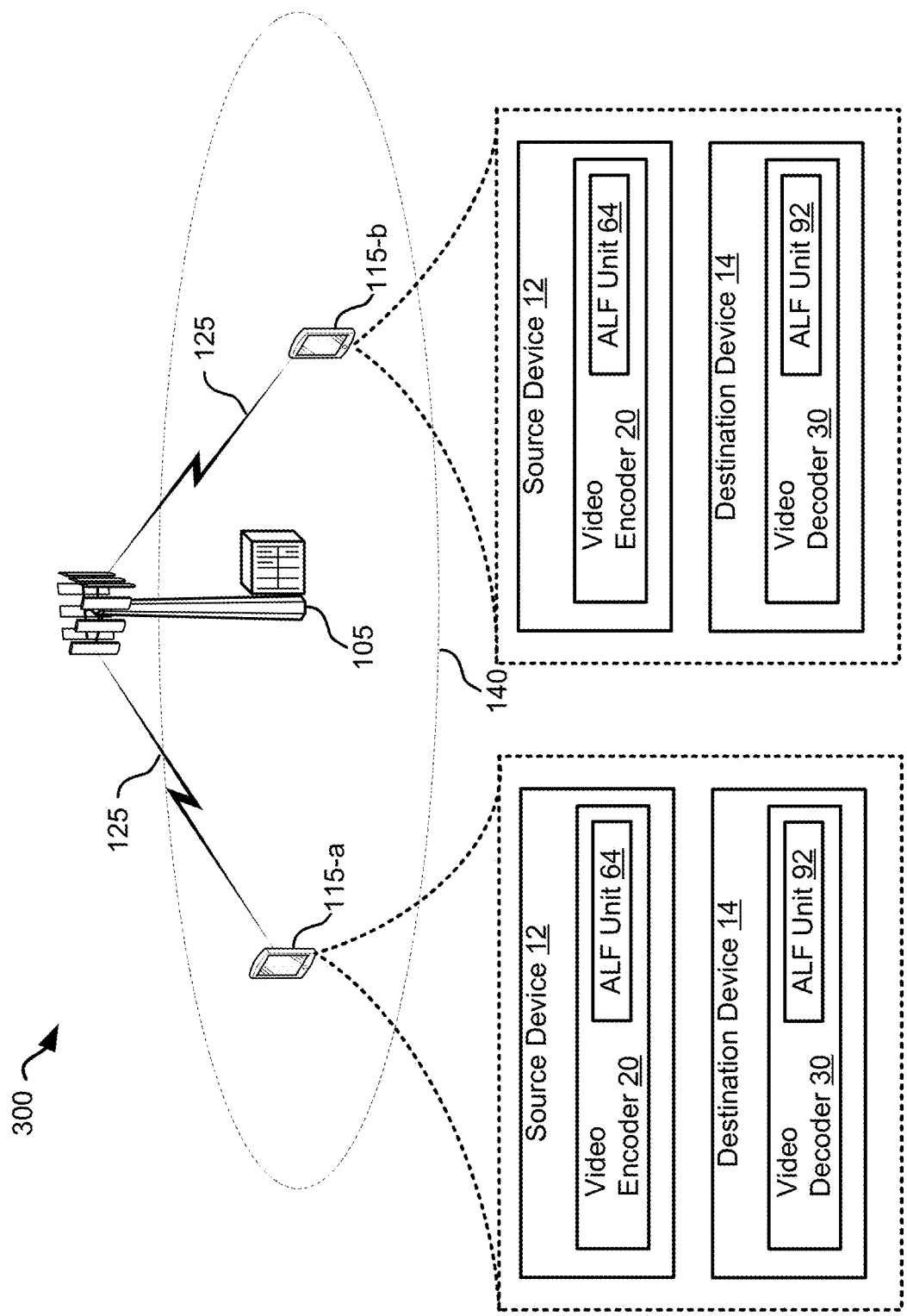
FIG. 3 is a diagram illustrating an example of a network including a wireless communication device, in accordance with various aspects of the disclosure.

The output interface 22 of the source device 12 may send the NAL units making up the encoded or coded video data over the communications link 40 (e.g., communication links 125 in FIG. 3) to the destination device 14. Additionally or alternatively, the output interface 22 may send the coded video data to a storage device 26, from which the coded video data can be sent to the destination device 14. The input interface 28 of the destination device 14 may receive the NAL units. The communications link 40 may include a signal transmitted using a wireless network, a wired network, or a combination of a wired and wireless network. A wireless network may include any wireless interface or combination of wireless interfaces and may include any suitable wireless network (e.g., the internet or other wide area network, a packet-based network, WiFi™, radio frequency (RF), UWB, WiFi-Direct, cellular, Long-Term Evolution (LTE), WiMax™, or the like). An example of a wireless network is illustrated in FIG. 3. A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the source device 12 may store coded video data in storage 21. The output interface 22 may retrieve the coded video data from the video encoder 20 or from the storage 21. The storage 21 may include any of a variety of distributed or locally accessed data storage media. For example, the storage 21 may include a hard drive, a storage disc, flash memory, volatile or non-volatile memory, or any other suitable digital storage media for storing encoded video data. Although shown as separate from the video encoder 20, the storage 21, or at least part of the storage 21, may be implemented as part of the video encoder 20.

The input interface 28 receives the coded video data and may provide the video data to the video decoder 30 (or decoder) or to the storage 31 for later use by the video decoder 30. The video decoder 30 may decode the coded video data by entropy decoding (e.g., using an entropy decoder) and extracting the elements of the coded video sequence making up the encoded video data. The video decoder 30 may then rescale and perform an inverse transform on the encoded video data. Residues are then passed to a prediction stage (e.g., prediction process) of the video decoder 30. The video decoder 30 may then predict a block of pixels (e.g., a PU). In some examples, the prediction is added to the output of the inverse transform.

The video decoder 30, like the video encoder 20, can implement ALF or GALF, and can be configured to perform one or more of the enhancements described herein for ALF and GALF. For example, the video decoder 30 can implement various techniques, including expanding geometric transformations, more flexible use of multiple filter supports, and improvements in chroma filtering. In this regard, the video encoder 20 may perform some of the techniques for ALF and GALF described herein to produce coded video data, and may signal related information to the video decoder 30 such that the video decoder 30 can perform corresponding techniques on the coded video data to decode the coded video data.

The destination device 14 may output the decoded video to the display device 32 for displaying the decoded video data to a consumer of the content. In some aspects, the display device 32 may be part of the destination device 14. In some aspects, the video display device 32 may be part of a separate device other than the destination device 14.

In some aspects, the source device 12 and/or the destination device 14 may be integrated with an audio encoding device and audio decoding device, respectively. The source device 12 and/or the destination device 14 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The source device 12 and the destination device 14 may be integrated as part of a combined encoder/decoder (codec) in a respective device.

Figure 2A:
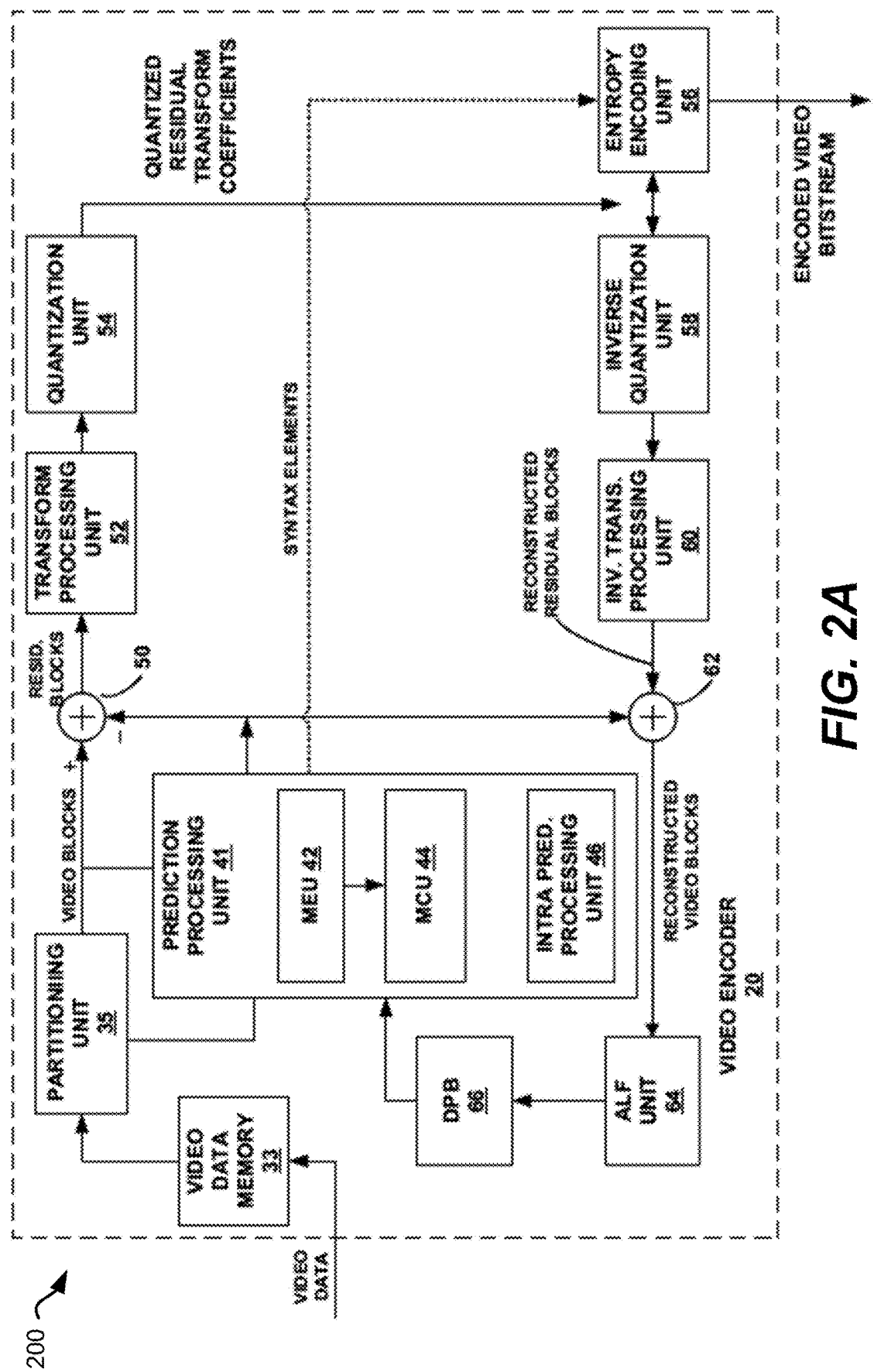
FIG. 2A is a block diagram illustrating an example of a video decoder, in accordance with various aspects of the disclosure.

Referring to FIG. 2A, a block diagram 200 is shown illustrating an example of the video encoder 20 in FIG. 1. The video encoder 20 may, for example, perform encoding operations and may generate syntax structures (e.g., syntax elements). The video encoder 20 may perform intra-prediction and inter-prediction coding of video data (e.g., video blocks) within video slices. Intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode) described above, may refer to any of several temporal-based compression modes.

The video encoder 20 includes a video data memory 33 that receives video data, a partitioning unit 35, a prediction processing unit 41, an ALF unit 64, a decoded picture buffer (DPB) 66, a summer 50, a transform processing unit 52, a quantization unit 54, and an entropy encoding unit 56. The prediction processing unit 41 includes a motion estimation unit (MEU) 42, a motion compensation unit (MCU) 44, and an intra-prediction processing unit 46. For video block reconstruction, the video encoder 20 also includes an inverse quantization unit 58, an inverse transform processing unit 60, and a summer 62. In addition to the ALF unit 64, the video encoder 20 may include other loop filters such as a deblocking filter and a sample adaptive offset (SAO) filter, for example. A post processing device (not shown) may perform additional processing on encoded or coded video data generated by the video encoder 20. The techniques of this disclosure may, in some instances, be implemented by the video encoder 20 in, for example, the ALF unit 64.

As shown in FIG. 2A, the video encoder 20 receives video data, and the partitioning unit 35 partitions the data into video blocks. The partitioning may also include partitioning into slices, slice segments, tiles, or other larger units, as wells as video block partitioning, e.g., according to a quadtree structure of largest coding units (LCUs) and CUs. The video encoder 20 generally illustrates the components that encode video blocks within a video slice to be encoded. The slice may be divided into multiple video blocks (and possibly into sets of video blocks referred to as tiles). The prediction processing unit 41 may perform a prediction operation or process, which may include selecting one of a plurality of possible coding modes, such as one of a plurality of intra-prediction coding modes or one of a plurality of inter-prediction coding modes, for the current video block based on error results (e.g., coding rate and the level of distortion, or the like). The prediction processing unit 41 may provide the resulting intra- or inter-coded block to the summer 50 to generate residual block data and to the summer 62 to reconstruct the encoded block for use as a reference picture.

The intra-prediction processing unit 46 within the prediction processing unit 41 may perform intra-prediction coding of the current video block relative to one or more neighboring blocks in the same frame or slice as the current block to be coded to provide spatial compression. The motion estimation unit 42 and the motion compensation unit 44 within the prediction processing unit 41 perform inter-predictive coding of the current video block relative to one or more predictive blocks in one or more reference pictures to provide temporal compression.

The motion estimation unit 42 may be configured to determine the inter-prediction mode for a video slice according to a predetermined pattern for a video sequence. The predetermined pattern may designate video slices in the sequence as P slices, B slices, or GPB slices. The motion estimation unit 42 and the motion compensation unit 44 may be highly integrated, but are illustrated separately for conceptual purposes. The motion estimation, performed by the motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the video encoder 20 may calculate values for sub-integer pixel positions of reference pictures stored in the DPB 66. For example, the video encoder 20 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the DPB 66. The motion estimation unit 42 sends the calculated motion vector to the entropy encoding unit 56 and the motion compensation unit 44.

The motion compensation, performed by the motion compensation unit 44, may involve fetching or generating the predictive block based on the motion vector determined by motion estimation, possibly performing interpolations to sub-pixel precision. Upon receiving the motion vector for the PU of the current video block, the motion compensation unit 44 may locate the predictive block to which the motion vector points in a reference picture list. The video encoder 20 forms a residual video block by subtracting pixel values of the predictive block from the pixel values of the current video block being coded, forming pixel difference values. The pixel difference values form residual data for the block, and may include both luma and chroma difference components. The summer 50 represents the component or components that perform this subtraction operation. The motion compensation unit 44 may also generate syntax elements associated with the video blocks and the video slice for use by the destination device 14 in decoding the video blocks of the video slice.

The intra-prediction processing unit 46 may intra-predict a current block, as an alternative to the inter-prediction performed by the motion estimation unit 42 and the motion compensation unit 44, as described above. In particular, the intra-prediction processing unit 46 may determine an intra-prediction mode to use to encode a current block. In some examples, the intra-prediction processing unit 46 may encode a current block using various intra-prediction modes, e.g., during separate encoding passes, and the intra-prediction unit processing 46 may select an appropriate intra-prediction mode to use from the tested modes. For example, the intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. The intra-prediction processing unit 46 may calculate ratios from the distortions and rates for the various encoded blocks to determine which intra-prediction mode exhibits the best rate-distortion value for the block.

After selecting an intra-prediction mode for a block, the intra-prediction processing unit 46 may provide information indicative of the selected intra-prediction mode for the block to the entropy encoding unit 56. The entropy encoding unit 56 may encode the information indicating the selected intra-prediction mode. The video encoder 20 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After the prediction processing unit 41 generates the predictive block for the current video block via either inter-prediction or intra-prediction, the video encoder 20 forms a residual video block by subtracting the predictive block from the current video block. The residual video data in the residual block may be included in one or more TUs and applied to the transform processing unit 52. The transform processing unit 52 transforms the residual video data into residual transform coefficients using a transform, such as a discrete cosine transform (DCT) or a conceptually similar transform. The transform processing unit 52 may convert the residual video data from a pixel domain to a transform domain, such as a frequency domain.

The transform processing unit 52 may send the resulting transform coefficients to quantization unit 54. The quantization unit 54 quantizes the transform coefficients to further reduce bit rate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively, the entropy encoding unit 56 may perform the scan.

Following quantization, the entropy encoding unit 56 entropy encodes the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by the entropy encoding unit 56, the encoded bitstream may be transmitted to the destination device 14, or archived/stored for later transmission or retrieval by the destination device 14. The entropy encoding unit 56 may also entropy encode the motion vectors and the other syntax elements for the current video slice being coded.

The inverse quantization unit 58 and the inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. The motion compensation unit 44 may also apply one or more interpolation filters to the reconstructed residual block to calculate sub-integer pixel values for use in motion estimation. The summer 62 adds the reconstructed residual block to the motion compensated prediction block produced by motion compensation unit 44 to produce a reference block for the ALF unit 64. The reference block may be filtered at the ALF unit 64 and stored at the DPB 66 before being used by the motion estimation unit 42 and the motion compensation unit 44 as a reference block to inter-predict a block in a subsequent video frame or picture.

The ALF unit 64 can perform various ALF and GALF operations, including the various techniques described herein. Aspects of the various operations supported by the ALF unit 64 are described in more detail below, including components (see e.g., FIG. 15) that support the ALF and GALF enhancements described in this disclosure. Moreover, the ALF unit 64 can perform any of the encoding methods described in FIGS. 16, 18, and 19.

Additional details related to the video decoder 30 are provided below with reference to FIG. 2B. The video decoder 30 includes a video data memory 78 that receives an encoded bitstream, an entropy decoding unit 80, a prediction processing unit 81, an inverse quantization unit 86, an inverse transform processing unit 88, a summer 90, an ALF unit 92, and a DPB 94. The prediction processing unit 81 includes a motion compensation unit 82 and an intra prediction processing unit 84. The video decoder 30 may, in some examples, perform a decoding pass generally reciprocal to the encoding pass described with respect to the video encoder 20 from FIG. 2A.

During the decoding process, the video decoder 30 receives an encoded video bitstream that represents video blocks of an encoded video slice and associated syntax elements sent by the video encoder 20 in the source device 12. The video decoder 30 may receive the encoded video bitstream from the source device 12 or may receive the encoded video bitstream from a network entity (not shown), such as a server, a media-aware network element (MANE), a video editor/splicer, or other such device configured to implement one or more of the techniques described above. The network entity may or may not include the source device 12. In some video decoding systems, the network entity and the video decoder 30 in the destination device 14 may be parts of separate devices, while in other instances, the functionality described with respect to the network entity may be performed by the same device that comprises the video decoder 30.

The entropy decoding unit 80 of the video decoder 30 entropy decodes the bitstream to generate quantized coefficients, motion vectors, and other syntax elements. The entropy decoding unit 80 forwards the motion vectors and other syntax elements to the prediction processing unit 81. The video decoder 30 may receive the syntax elements at the video slice level and/or the video block level. The entropy decoding unit 80 may process and parse both fixed-length syntax elements and variable-length syntax elements.

When the video slice is coded as an intra-coded (I) slice, the intra prediction processing unit 84 of the prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, the motion compensation unit 82 of the prediction processing unit 81 produces predictive blocks for a video block of the current video slice based on the motion vectors and other syntax elements received from the entropy decoding unit 80. The predictive blocks may be produced from one of the reference pictures within a reference picture list. The video decoder 30 may construct the reference frame lists, List 0 and List 1, using default construction techniques based on reference pictures stored in the DPB 94.

The motion compensation unit 82 determines prediction information for a video block of the current video slice by parsing the motion vectors and other syntax elements, and uses the prediction information to produce the predictive blocks for the current video block being decoded. For example, the motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation unit 82 may also perform interpolation based on interpolation filters. The motion compensation unit 82 may use interpolation filters as used by video encoder 20 in the source device 12 during encoding of the video blocks to calculate interpolated values for sub-integer pixels of reference blocks. In this case, the motion compensation unit 82 may determine the interpolation filters used by the video encoder 20 in the source device 12 from the received syntax elements, and may use the interpolation filters to produce predictive blocks.

The inverse quantization unit 86 inverse quantizes, or de-quantizes, the quantized transform coefficients provided in the bitstream and decoded by entropy decoding unit 80. The inverse quantization process may include use of a quantization parameter calculated by the video encoder 20 in the source device 12 for each video block in the video slice to determine a degree of quantization and, likewise, a degree of inverse quantization that should be applied. The inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After the motion compensation unit 82 generates the predictive block for the current video block based on the motion vectors and other syntax elements, the video decoder 30 forms a decoded video block by summing the residual blocks from the inverse transform processing unit 88 with the corresponding predictive blocks generated by the motion compensation unit 82. The summer 90 represents the component or components that perform this summation operation. If desired, and in addition to the ALF unit 92, loop filters (either in the coding loop or after the coding loop) may also be used to smooth pixel transitions, or to otherwise improve the video quality. For example, one or more loop filters such as a deblocking filter and a sample adaptive offset (SAO) filter may be used in addition to the ALF unit 92. The decoded video blocks in a given frame or picture are then stored in the DPB 94, which stores reference pictures used for subsequent motion compensation. The DPB 94 also stores decoded video for later presentation on a display device, such as display device 32 shown in FIG. 1.

The ALF unit 92 can perform various ALF and GALF operations, including the various techniques described herein. Aspects of the various operations supported by the ALF unit 92 are described in more detail below, including components (see e.g., FIG. 15) that support the ALF and GALF enhancements described in this disclosure. Moreover, the ALF unit 92 can perform any of the encoding methods described in FIGS. 17, 20, and 21.

Figure 2B:
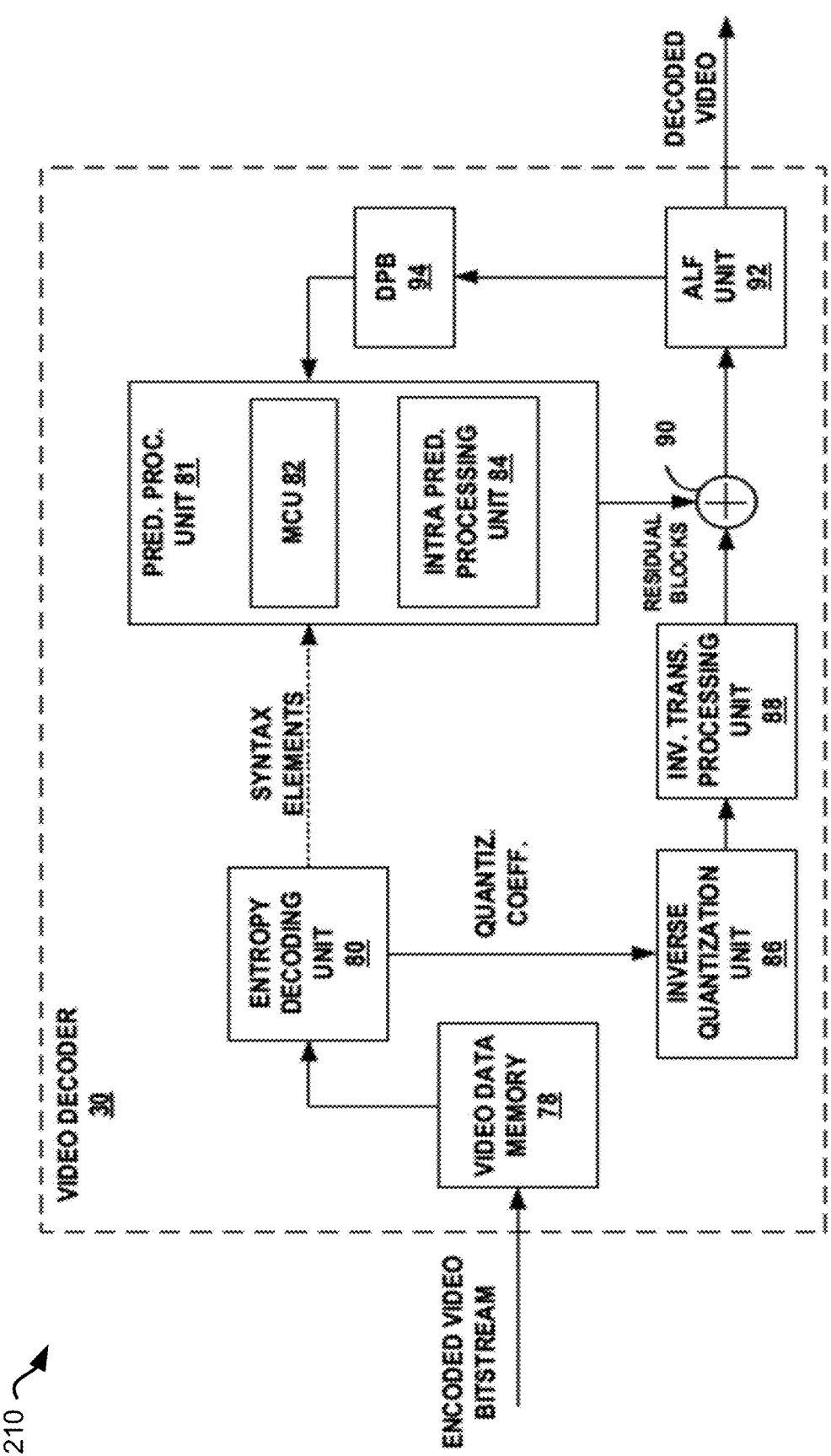
FIG. 2B is a block diagram illustrating an example of a video encoder, in accordance with various aspects of the disclosure.
Figure 15:
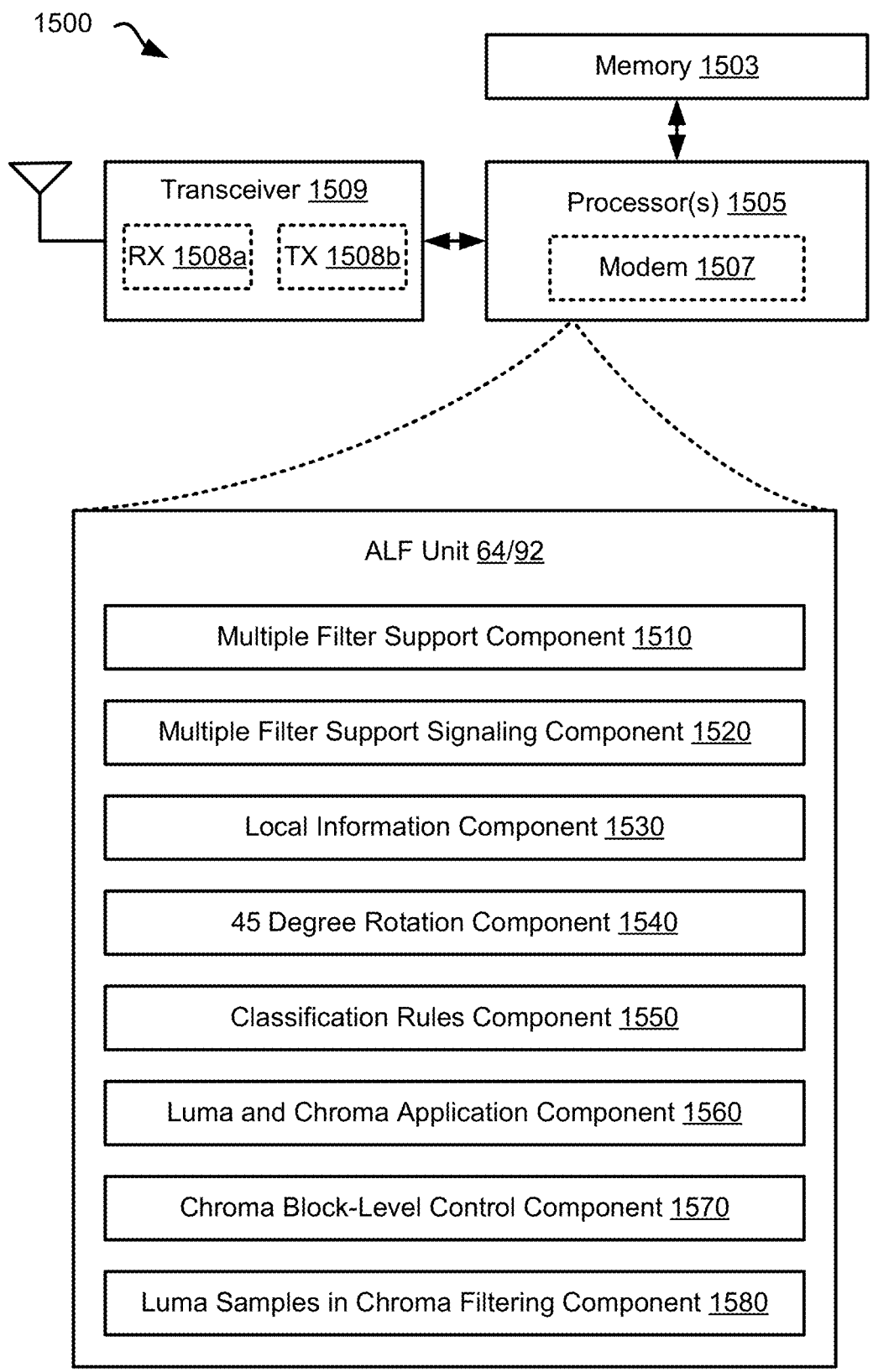
FIG. 15 is a block diagram illustrating an example of a processing system configured to perform various ALF and GALF aspects, in accordance with various aspects of the disclosure.

The ALF and GALF techniques of this disclosure may be performed by a video encoding device such as the source device 12, a video decoding device such as the destination device 14, or by a video encoding/decoding device, typically referred to as a "codec." Moreover, the ALF and GALF techniques of this disclosure may also be performed by a video preprocessor (see e.g., processor(s) 1505 in FIG. 15), which can implement at least some of the functionality of the ALF units 64 and 92 described in connection with FIGS. 2A, 2B, and 15.

FIG. 3 shows a wireless network 300 that includes a base station 105 and wireless communication devices 115-a and 115-b. The wireless network 300 may represent a portion of the system 100 in FIG. 1. As described above, encoded video data (e.g., encoded bitstream having coded video data) may be transmitted over a wireless network such as the wireless network 300.

The base station 105 provides a coverage 140 that allows both wireless communication devices 115-a and 115-b to communicate with the base station 105 using communication links 125. The wireless communication devices 115-a and 115-b may communicate with each other through the base station 105 or may be able to communicate with a remote device through the base station 105. Communications by the wireless communication devices 115-a and 115-b may use signals that are configured and processed (e.g., modulated) in accordance with a cellular communication standard, or some other wireless communication standard. In one example, one of the wireless communication devices 115-a and 115-b may communicate with another wireless communication device under the coverage of a different base station by having that base station communicate with the base station 105. In another example, one of the wireless communication devices 115-a and 115-b may communicate with a server, a database, a network storage device, or any other type of non-mobile destination device through the base station 105.

In one scenario, either the wireless communication device 115-a or the wireless communication device 115-b may operate as a transmitting or source device (e.g., a transmitter). In such a scenario, the wireless communication device may encode video data using the source device 12 that is part of the wireless communication device. The encoded video data may be transmitted via the wireless network 300 to a destination device. To encode the video data, the wireless communication device uses the video encoder 20 and the ALU unit 64 in the source device 12.

In another scenario, either the wireless communication device 115-a or the wireless communication device 115-b may operate as a receiving or destination device (e.g., a receiver). In such a scenario, the wireless communication device may decode video data using the destination device 14 that is part of the wireless communication device. To decode the video data, the wireless communication device uses the video decoder 30 and the ALU unit 92 in the destination device 14.

In yet another scenario, the wireless communication device 115-a may operate as a transmitting or source device and the wireless communication device 115-b may operate as a receiving or destination device. In such a scenario, the wireless communication device 115-a may encode video data using the video encoder 20 and the ALF unit 64 in the source device 12 that is part of the wireless communication device 115-a, and the wireless communication device 115-b may decode the encoded video data using the video decoder 30 and the ALF unit 92 in the destination device 14 that is part of the wireless communication device 115-b.

The scenarios described above in connection with FIG. 3 have been provided by way of illustration and are not intended to be limiting. A wireless communication device 115-a or 115-b can be or can include the source device 12 (and respectively the video encoder 20 and the ALF unit 64), can be or can include the destination device 14 (and respectively the video decoder 30 and the ALF unit 92), or can be or can include both the source device 12 and the destination device 14.

The ALF and GALF techniques in this disclosure are described in connection with various video coding standards. Video coding standards can include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition to these video coding standards, a new video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification, referred to as HEVC WD, is generally available (see e.g., http://phenix.int-evry.fr/jct/doc_end_user/documents/14_Vienna/wg11/JCTVC-N1003-v1.zip). The HEVC standard was been finalized in January 2013.

Certain groups, namely ITU-T VCEG (Q6/16) and ISO/IEC MPEG (JTC 1/SC 29/WG 11), are considering the standardization of future video coding technology with a compression capability that could significantly exceeds that of the current HEVC standard (including its current extensions and near-term extensions for screen content coding and high-dynamic-range coding). These groups are working together in a joint collaboration effort known as the Joint Video Exploration Team (JVET) to evaluate compression technology designs proposed by their experts in this area. The latest version of the reference software, that is, the Joint Exploration Model 3 or JEM 3 is generally available (see e.g., https://jvet.hhi.fraunhofer.de/svn/svn_HMJEMSoftware/tags/HM-16.6-JEM-3.0/).

Figure 4:
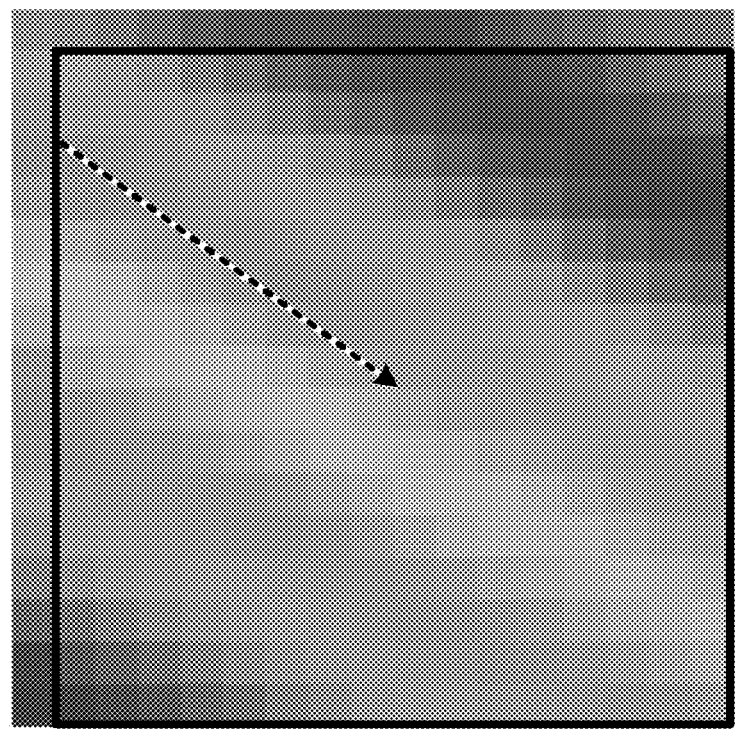
FIG. 4 is a diagram illustrating an example of intra prediction for a 16×16 image/video block, in accordance with various aspects of the disclosure.

The HEVC standard supports intra prediction, which performs image block prediction using its spatially neighboring reconstructed image samples (e.g., pixels). A typical example of the intra prediction for a 16×16 image/video block is shown in diagram 400 in FIG. 4. In the diagram 400, with intra prediction, the 16×16 image/video block (square with heavy black line) is predicted by the above/top and left neighboring reconstructed samples (e.g., reference samples) along a selected prediction direction (as indicated by the dashed arrow).

Figure 5:
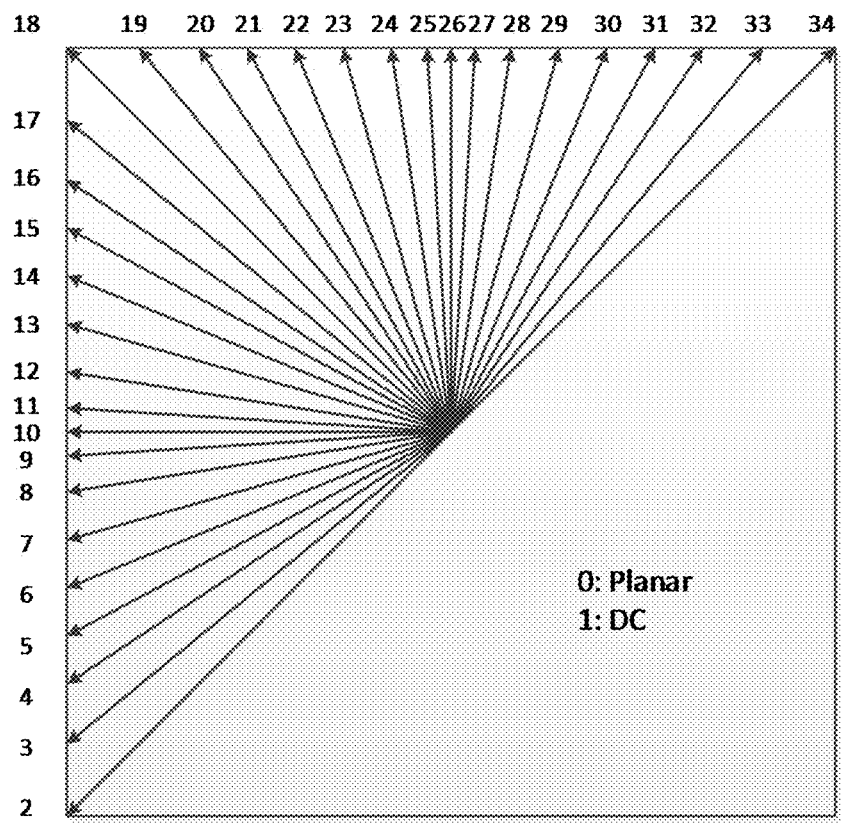
FIG. 5 is a diagram illustrating examples of intra prediction modes defined for HEVC, in accordance with various aspects of the disclosure.

In addition, for HEVC, the intra prediction of a luma block (e.g., an image/video block of luma components) includes 35 modes. These modes, as shown in diagram 500 in FIG. 5, include a planar mode (0), a DC mode (1), and 33 angular modes. The 35 modes of intra prediction defined in HEVC are indexed as shown in TABLE 1 below.

TABLE 1

Specification of intra prediction mode and associated names.

| Intra Prediction Mode | Associated Name |
|---|---|
| 0 | INTRA_PLANAR |
| 1 | INTRA_DC |
| 2 ... 34 | INTRA_ANGULAR2..INTRA_ANGULAR34 |

Figure 6:
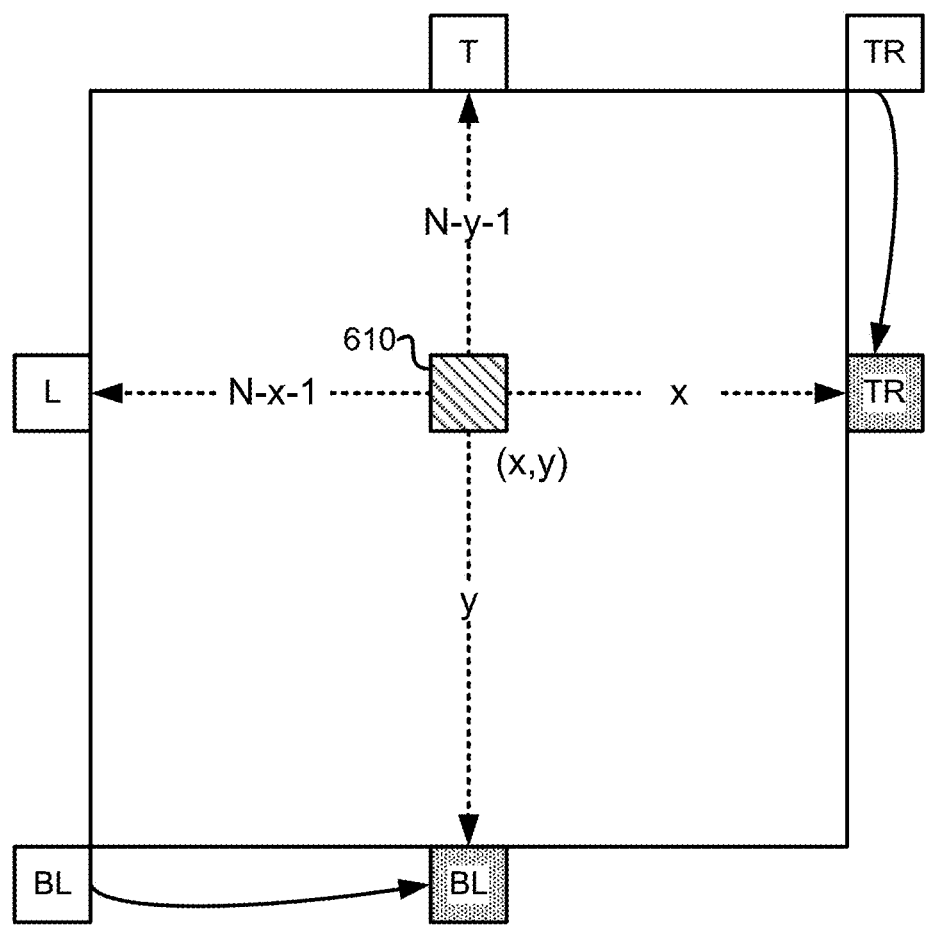
FIG. 6 is a diagram illustrating an example of a planar mode defined in HEVC, in accordance with various aspects of the disclosure.

For planar mode (0), which is typically the most frequently used intra prediction mode, the prediction sample is generated as shown in diagram 600 in FIG. 6. To perform planar mode prediction for an N×N block, for each sample $p_{xy}$, located at (x, y) (see e.g., sample 610 in FIG. 6), the prediction value is calculated using four specific neighboring reconstructed samples, i.e., reference samples, with a bilinear filter. The four reference samples include the top-right reconstructed sample (TR), the bottom-left reconstructed sample (BL), the reconstructed sample located at the same column of the current sample, denoted by T for $r_{x,-1}$, and the reconstructed sample located at the same row of the current sample, denoted by R for $r_{-1,y}$. The planar mode can be formulated as shown in equation (1) below:

$$p_{xy}=(N-x-1)\cdot L+(N-y-1)\cdot T+x\cdot TR+y\cdot BL. \quad (1)$$

For the DC mode (1), the prediction block is simply filled with the average value of the neighboring reconstructed samples. Generally, both the planar mode and the DC mode are applied for modeling smoothly varying and constant image regions.

Figure 7:
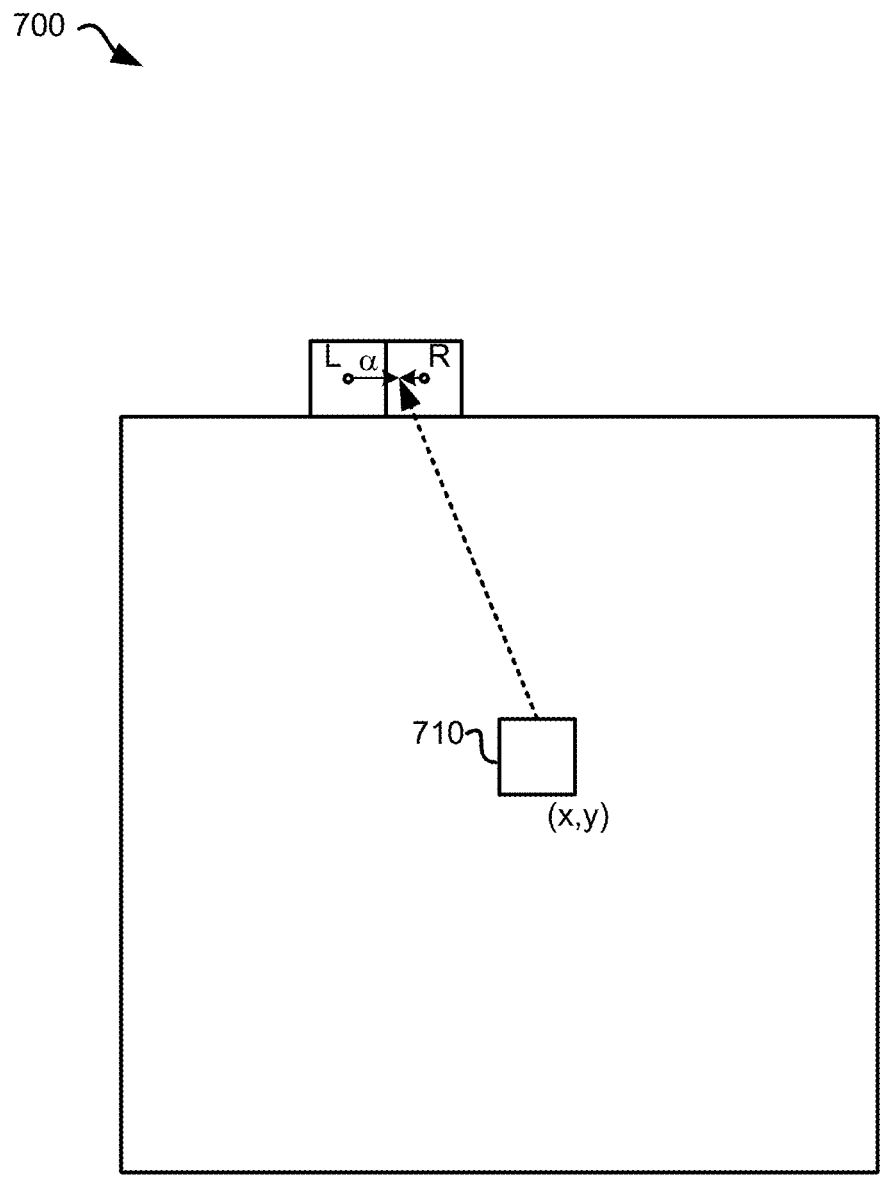
FIG. 7 is a diagram illustrating an example of an angular mode defined in HEVC, in accordance with various aspects of the disclosure.

For angular intra prediction modes in HEVC, which include a total of 33 different prediction directions as discussed above, the intra prediction process is described as follows. For each given angular intra prediction, the intra prediction direction can be identified accordingly, for example, according to FIG. 5. For example, intra mode 10 corresponds to a pure horizontal prediction direction, while intra mode 26 corresponds to a pure vertical prediction direction. Given a specific intra prediction direction, for each sample of the prediction block, the coordinate (x, y) of the sample is first projected to the row/column of neighboring reconstructed samples along the prediction direction, as shown in an example in diagram 700 in FIG. 7. Suppose, that the coordinate (x,y) of sample 710 is projected to the fractional position a between two neighboring reconstructed samples L and R, then the prediction value for (x, y) is calculated using a two-tap bi-linear interpolation filter, as shown by equation (2) below:

$$p_{xy}=(1-\alpha)\cdot L+\alpha\cdot R. \quad (2)$$

To avoid floating point operations, in HEVC, the calculation in equation (2) can be approximated using integer arithmetic as shown by equation (3) below:

$$p_{xy}=((32-\alpha)\cdot L+\alpha\cdot R+16)>>5, \quad (3)$$

where a is a integer equal to 32*α.

For HEVC, the use of in-loop adaptive filters was evaluated but not included in the final version. In the field of video coding, it is common to apply filtering in order to enhance the quality of a decoded video signal. The filter can be applied as a post-filter, where filtered picture or frame is not used for prediction of future frames or in-loop filter, where filtered picture or frame is used to predict future frame (e.g., intra prediction). A filter can be designed for example by minimizing the error between the original signal or sample and the decoded filtered signal or sample. Similarly to transform coefficients, the coefficients of the filter h(k, l), k=−K, ..., K, l=−K, ... K are quantized coded and send to the decoder as shown in equation (4):

$$f(k,l)=\text{round}(\text{normFactor}\cdot h(k,l)). \quad (4)$$

The normFactor in equation (4) is usually equal to $2^n$. The larger the value of normFactor the more precise is the quantization and the quantized filter coefficients f(k, l) provide better performance. On the other hand larger values of normFactor produce coefficients f(k, l) requiring more bits to transmit.

In the decoder (e.g., video decoder 30), the decoded filter coefficients f(k, l) are applied to the reconstructed image R(i, j) as shown below in equation (5):

$$\tilde{R}(i,j) = \sum_{k=-K}^{K}\sum_{l=-K}^{K} f(k,l)R(i+k,j+l) / \sum_{k=-K}^{K}\sum_{l=-K}^{K} f(k,l), \quad (5)$$

where i and j are the coordinates of the pixels within the frame.

Adaptive loop filter (ALF) is employed in JEM 2.0 and the basic idea is similar to the ALF with block based adaptation in HM-3. For the luma component, 4×4 blocks in the whole picture are classified based on one dimensional (1D) Laplacian direction (up to 3 directions) and two dimensional (2D) Laplacian activity (up to 5 activity values). The calculation of direction $Dir_b$ and unquanitzed activity $Act_b$ is shown in equations (6) through (9), where $\hat{I}_{i,j}$ indicates a reconstructed pixel with relative coordinate (i, j) to the top-left of a 4×4 block. $Act_b$ is further quantized to the range of 0 to 4 inclusively.

$$V_{i,j} = |\hat{I}_{i,j} \times 2 - \hat{I}_{i,j-1} - \hat{I}_{i,j+1}| \quad (6)$$

$$H_{i,j} = |\hat{I}_{i,j} \times 2 - \hat{I}_{i,j-1} - \hat{I}_{i+1,j}| \quad (7)$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} H_{i,j}\right) \\ 0, & \text{otherwise} \end{cases} \quad (8)$$

$$Act_b = \sum_{i=0}^{3}\sum_{j=0}^{3}\left(\sum_{m=i-1}^{i+1}\sum_{n=j-1}^{j+1}(V_{m,n}+H_{m,n})\right) \quad (9)$$

The direction $Dir_b$ may refer to the 1D direction of samples. For example, samples located on a same horizontal line will have a horizontal direction and samples located on same vertical line will have a vertical direction. Activity may refer to a difference between a current sample and the sample's neighbors. As used herein the terms "samples" and "pixels" may be interchangeable.

Figure 8A:
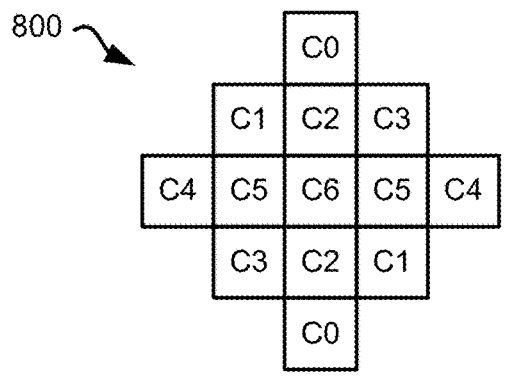
FIGS. 8A-8C are diagrams illustrating examples of ALF filter supports, in accordance with various aspects of the disclosure.
Figure 8B:
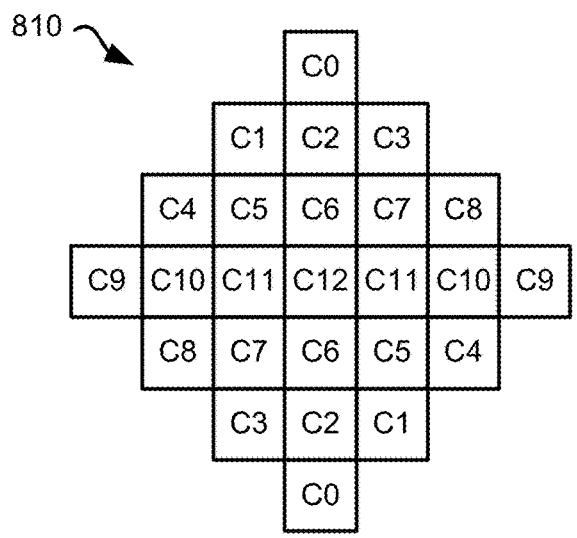
Figure 8C:
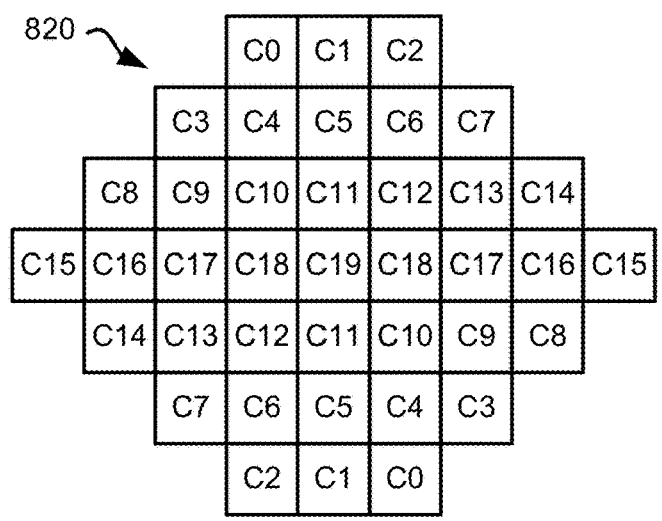

In total, each block can be categorized into one out of 15 (5×3) classes and an index is assigned to each 4×4 block according the value of $Dir_b$ and $Act_b$ of the block. Denote the group index by C and is set equal to $5Dir_b+\hat{A}$ wherein $\hat{A}$ is the quantized value of $Act_b$. Therefore, up to 15 sets of ALF parameters could be signalled for the luma component of a picture. To save the signaling cost, the groups may be merged along group index value. For each merged group, a set of ALF coefficients can be signaled. Up to three circular symmetric filter shapes (also referred to as filter supports) are supported. For example, FIG. 8A shows a diagram 800 of a first filter support, a 5×5 diamond-shaped filter support. FIGS. 8B and 8C show in diagrams 810 and 820, respectively, a second filter support (7×7 diamond-shaped filter support) and a third filter support (truncated 9×9 diamond-shaped filter support).

For both chroma components in a picture (e.g., Cb, Cr), a single set of ALF coefficients is applied and the 5×5 diamond-shaped filter is always used.

At decoder side, each pixel sample $\hat{I}_{i,j}$ is filtered, resulting in pixel value $I'_{i,j}$ as shown in equation (10), where L denotes filter length, $f_{m,n}$ represents filter coefficient and o indicates filter offset.

$$I'_{i,j}=(\Sigma_{m=-L}^{L}\Sigma_{n=-L}^{L}f_{m,n}\times\hat{I}_{i+m,j+n}+o)>>(BD_F-1) \quad (10)$$

wherein $(1<<(BD_F-1))=\Sigma_{m=-L}^{L}\Sigma_{n=-L}^{L}f(m, n)$ and $(o=(1<<(BD_F-2))$.

In current JEM2.0, the bit-depth, denoted by $BD_F$ is set to 9, which means the filter coefficient could be in the range of [−256, 256].

Note that for current design, only up to one filter is supported for two chroma components.

An important aspect in the current ALF is the signaling of the filter coefficients.

Total Number of Filters:

The total number of filters (or total number of merged groups) can be first signaled when ALF is enabled for one slice. It is applied to the luma component. For chroma component, since only one filter may be applied, there is no need to signal such information.

Filter Support:

An index of the three filter supports (see e.g., FIGS. 8A-8C) can be signaled.

Filter Index:

Classes which have non-consecutive values of C can be merged, that is, can share the same filter. By coding one flag of each class to indicate it is merged or not, the filter index could be derived.

froceCoeff0 Flag:

The froceCoeff0 flag can be used to indicate whether at least one of the filters need not be coded. When this flag is equal 0, all of the filters need to be coded. When this flag is equal 1, one flag of each merged group, denoted by CodedVarBin, is further signaled to indicate the filter whether the filter is to be signaled or not. When the filter is not signaled, it means all of the filter coefficients associated with the filter are equal to 0.

Prediction Method:

When multiple groups of filters need to be signaled, one of the two methods could be used.

In a first method, all of the filters are coded directly into the filter information. In this case, for example, the values of the filter coefficients may be encoded into the bitstream without using any predictive encoding techniques.

In a second method, the filter coefficients of the first filter are directly coded. For the remaining filters, they are predictively coded into the filter information. In this case, the values of the filter coefficients may be defined by residual values or differences relative to the filter coefficients associated with a previously coded filter. The previously coded filter is the one that is the most recent one, that is, the filter indices of current filter and its predictor are consecutive.

To indicate the usage of one of the above two methods, one flag is coded when the number of merged groups is larger than 1 and froceCoeff0 is equal to 0.

Figure 9:
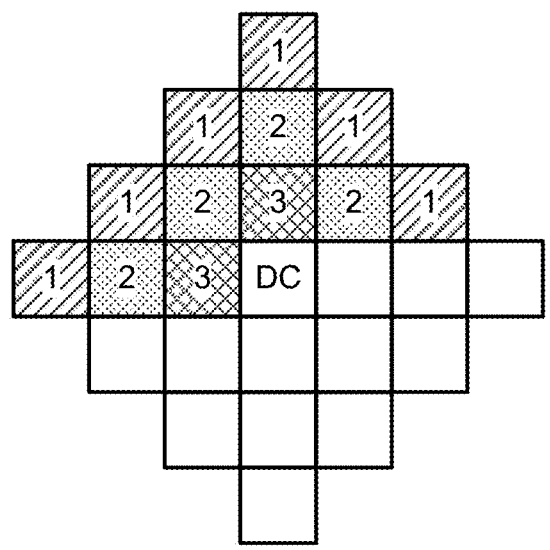
FIG. 9 is a diagram illustrating an example of a 7×7 filter shape with 3 categories for filter coefficients signaling, in accordance with various aspects of the disclosure.

Filter Coefficients with Golomb Coding:

Based on the distance between one position and the position of DC filter coefficient, one filter support could be split into multiple categories. In one example, a 7×7 diamond-shaped symmetric filter having 3 categories is depicted in diagram 900 in FIG. 9. Each square denotes one filter coefficient and squares with the same background color are coded with the same Golomb parameter.

The signaling of the filter coefficients consists two parts. The first part of the signaling includes the Golomb parameters. One value of Golomb parameter (denoted by kMin) is first signaled, followed by one bit flag for each category. The one bit flag indicates whether the parameter of category i (i from 1 to 3, inclusive, for the 7×7 diamond-shaped symmetric filter support in FIG. 9) is the same or increased by 1 compared to the Golomb parameter used for the previous category (i−1) when i is larger than 1; or compared to kMin when i is equal to 1.

The second part of the signaling includes the coefficients. Based on the selected Golomb parameters, the absolute values of coefficients are coded followed by the sign flag.

Another aspect associated with the current ALF is the temporal prediction of filter coefficients. The ALF coefficients of reference pictures are stored and allowed to be reused as ALF coefficients of a current picture. For the current picture, the ALF coefficients stored for the reference pictures may be used, and therefore it may be possible to bypass the ALF coefficients signaling. In this case, only an index to one of the reference pictures needs to be signaled, and the stored ALF coefficients of the indicated reference picture are simply inherited for the current picture. To indicate the usage of temporal prediction, one flag can be first coded before sending the index.

It is important to note that in current ALF, the filter support is selected per slice for luma component such that for each slice one of the three filter supports (see e.g., FIGS. 8A-8C) will be selected. For chroma components, however, the only filter support used is the 5×5 diamond-shaped filter support. Because chroma information is typically smaller than luma information, a larger filter support may not be needed, which may also add complexity to the decoder.

As described above, geometry transformation-based ALF (GALF) provides some improvements to ALF, particularly by the introduction of geometric transformations to be applied to the samples in a filter support depending on the orientation of the gradient of the reconstructed samples (before adaptive loop filtering is applied). GALF has been adopted to the most recent version of JEM, that is, JEM3.0. In GALF, the classification is modified by taking into consideration the diagonal gradients and the geometric transformations can then be applied to filter coefficients. Each 2×2 block is categorized into one out of 25 classes based on its directionality and quantized value of activity. Additional details regarding the GALF operations are provided below.

Similar to the design of the existing or current ALF, the classification in GALF is still based on the 1D Laplacian direction and 2D Laplacian activity of each N×N luma block. However, the definitions of both direction and activity have been modified to better capture local characteristics. First, the values of two diagonal gradients, in addition to the horizontal and vertical gradients used in the existing ALF, are calculated using 1-D Laplacian. As it can be seen from equations (11) to (14), the sum of gradients of all pixels within a 6×6 window that covers a target pixel is employed as the represented gradient of target pixel. In some implementations, a window size of 6×6 can provide a good trade-off between complexity and coding performance. Each pixel is associated with four gradient values, with vertical gradient denoted by $g_v$, horizontal gradient denoted by $g_h$, a 135 degree diagonal gradient denoted by $g_{d1}$, and a 45 degree diagonal gradient denoted by $g_{d2}$.

$$g_v = \sum_{k=i-2}^{i+3} \sum_{l=j-2}^{j+3} V_{k,l}, \quad (11)$$

$$V_{k,l} = |2R(k, l) - R(k, l - 1) - R(k, l + 1)|$$

$$g_h = \sum_{k=i-2}^{i+3} \sum_{l=j-2}^{j+3} H_{k,l}, \quad (12)$$

$$H_{k,l} = |2R(k, l) - R(k - 1, l) - R(k + 1, l)|$$

$$g_{d1} = \sum_{k=i-2}^{i+3} \sum_{l=j-2}^{j+3} D1_{k,l}, \quad (13)$$

$$D1_{k,l} = |2R(k, l) - R(k - 1, l - 1) - R(k + 1, l + 1)|$$

$$g_{d2} = \sum_{k=i-2}^{i+3} \sum_{l=j-2}^{j+3} D2_{k,l}, \quad (14)$$

$$D2_{k,l} = |2R(k, l) - R(k - 1, l + 1) - R(k + 1, l - 1)|$$

The indices i and j in equations (11) to (14) refer to the coordinates of the upper left pixel in the 2×2 block.

To assign the directionality D, a ratio of maximum and minimum of the horizontal and vertical gradients, denoted by $R_{h,v}$ in equation (15) and a ratio of maximum and minimum of two diagonal gradients, denoted by $R_{d0,d1}$ in equation (16) are compared against each other with two thresholds $t_1$ and $t_2$.

$$R_{h,v} = g_{h,v}^{max}/g_{h,v}^{min}$$

wherein $g_{h,v}^{max} = \max(g_h, g_v), g_{h,v}^{min} = \min(g_h, g_v)$, (15)

$$R_{d0,d1} = g_{d0,d1}^{max}/g_{d0,d1}^{min}$$

wherein $g_{d0,d1}^{max} = \max(g_{d0}, g_{d1}), g_{d0,d1}^{min} = \min(g_{d0}, g_{d1})$. (16)

By comparing the detected ratios of horizontal/vertical and diagonal gradients, five direction modes, that is, D within the range of [0, 4] inclusive, are defined in equation (17). The values of D and their physical meaning are described in TABLE 2 below. Based on the information shown in TABLE 2, it may be possible to determine whether larger weights are needed for samples in one direction and/or whether smaller weights are needed for samples in another direction.

$$D = \begin{cases} 0 & R_{h,v} \leq t_1 \; \&\& \; R_{d0,d1} \leq t_1 \\ 1 & R_{h,v} > t_1 \; \&\& \; R_{h,v} > R_{d0,d1} \; \&\& \; R_{h,v} > t_2 \\ 2 & R_{h,v} > t_1 \; \&\& \; R_{h,v} > R_{d0,d1} \; \&\& \; R_{h,v} \leq t_2 \\ 3 & R_{d0,d1} > t_1 \; \&\& \; R_{h,v} \leq R_{d0,d1} \; \&\& \; R_{d0,d1} > t_2 \\ 4 & R_{d0,d1} > t_1 \; \&\& \; R_{h,v} \leq R_{d0,d1} \; \&\& \; R_{d0,d1} \leq t_2 \end{cases} \quad (17)$$

TABLE 2

Values of directions and their physical meaning.

| Direction values | Physical Meaning |
| --- | --- |
| 0 | Texture |
| 1 | Strong horizontal/vertical |
| 2 | horizontal/vertical |
| 3 | strong diagonal |
| 4 | diagonal |

The activity value A is calculated as shown in equation (18):

$$A = \sum_{k=i-2}^{i+3} \sum_{l=j-2}^{j+3} (V_{k,l} + H_{k,l}). \quad (18)$$

Where A is further quantized to the range of 0 to 4 inclusive, and the quantized value is denoted as Â.

Therefore, in the GALF scheme, each N×N block can be categorized or classified into one of 25 classes based on its directionality D and quantized value of activity Â as shown in equation (19) below:

$$C = 5D + \hat{A}. \quad (19)$$

Figures 10, 11A:
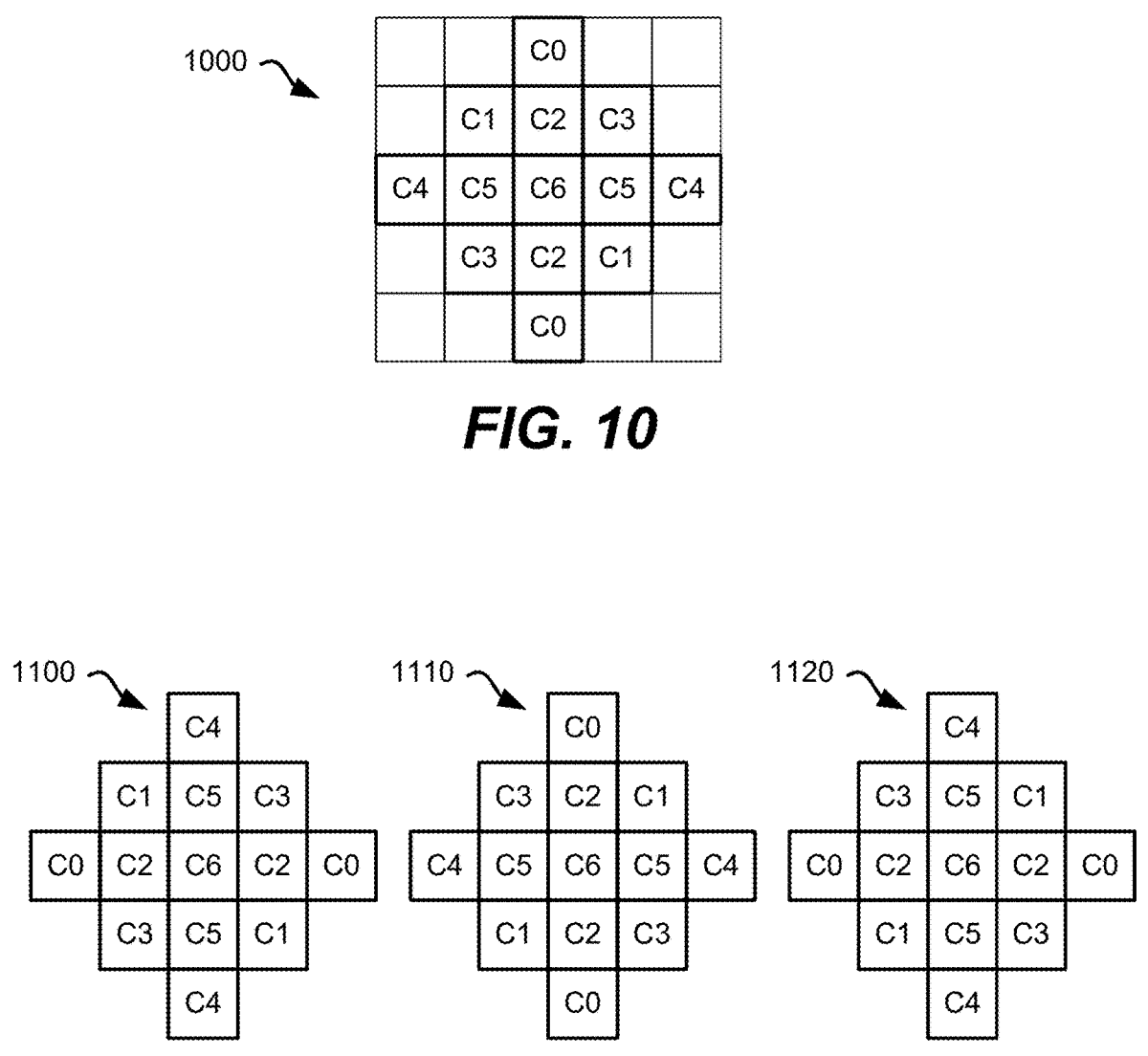

One of the features of GALF is the use of geometry transformations. For each category, one set of filter coefficients may be signaled. To better distinguish different directions of blocks marked with the same category index, four geometry transformations, including no transformation, diagonal, vertical flip, and rotation, are introduced. An example of a 5×5 filter support is illustrated in diagram 1000 in FIG. 10, and the three geometric transformations are depicted in FIGS. 11A-11C, with diagram 1100 in FIG. 11A showing an example of a diagonal transformation, diagram 1110 in FIG. 11B showing an example of a vertical flip, and diagram 1120 in FIG. 11C showing an example of a rotation transformation. Comparing FIGS. 11A-11C with FIG. 10, it is easy to get the expressions for the geometry transformations as shown below in equation (20):

Diagonal: $f_D(k,l) = f(l,k)$,

Vertical flip: $f_V(k,l) = f(k, K-l-1)$,

Rotation: $f_R(k,l) = f(K-l-1, k)$. (20)

where K is the size of the filter and $0 \leq k, l \leq K-1$ are coefficients coordinates, such that location (0,0) is at the upper left corner and location (K−1,K−1) is at the lower right corner. Note that when the diamond-shaped filter support is used, such as in the existing ALF, the coefficients with coordinate out of the filter support can simply be set to 0. One approach of indicating the geometry transformation index is to derive it implicitly to avoid additional overhead. In GALF, the transformations are applied to the filter coefficients f(k, l) depending on gradient values calculated for that block (e.g., video block). The relationship between the transformation and the four gradients calculated using equations (11)-(14) is described in TABLE 3. To summarize, the transformations are based on which one of two gradients (horizontal and vertical, or 45 degree and 135 degree gradients) is larger. Based on the comparison, more accurate direction information can be extracted. Therefore, different filtering results can be obtained due to transformation while the overhead of filter coefficients need not be increased.

TABLE 3

Mapping of gradients and transformations.

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Regarding filter supports, similar to ALF in HM, GALF also adopts the 5×5 and 7×7 diamond-shaped filter supports (see e.g., FIGS. 8A and 8B). In addition, the original 9×7 truncated diamond-shaped filter support (see e.g., FIG. 8C) is replaced by a 9×9 diamond-shaped filter support.

In addition, to improve coding efficiency when temporal prediction is not available (intra-coded frames), a set of 16 fixed filters can be assigned to each class. To indicate the usage of the fixed filter, a flag for each class can be signaled and if required, the index of the chosen fixed filter. Even when the fixed filter is selected for a given class, the coefficients of the adaptive filter f(k, l) can still be sent for this class, in which case, the coefficients of the filter which will be applied to the reconstructed image are sum of both sets of coefficients. A number of classes can share the same coefficients f(k, l) signaled in the bitstream even if different fixed filters have been chosen for them. In some implementations, the use of fixed filters may also be applied to inter-coded frames.

Like ALF, an important aspect in GALF is the signaling of the filter coefficients.

Prediction Pattern and Prediction Index from Fixed Filters:

Three cases are defined. In case 1, no filters of the 25 classes are predicted from a fixed filter; in case 2, all filters of the 25 classes are predicted from a fixed filter; and in case 3, filters associated with some of the 25 classes are predicted from fixed filters and filters associated with the rest of the 25 classes are not predicted from the fixed filters. An index may be first coded to indicate which of the three cases is being used. In addition, the following considerations may also apply. If it is case 1, there is no need to further signal the index of fixed filter. If it is case 2, an index of the selected fixed filter for each class can be signaled. Otherwise (if it is case 3), one bit for each class is first signaled, and if a fixed filter is used, the index is further signaled.

Skipping of DC Filter Coefficient:

Since the sum of all filter coefficients have to be equal to $2^K$ (wherein K denotes the bit-depth of filter coefficient), the DC filter coefficient that is applied to current pixel (center pixel within a filter support, such as $C_6$ in FIG. 10) can be derived without the need for signaling.

Filter Index:

To reduce the number of bits required to represent the filter coefficients, different classes can be merged. However, any set of classes can be merged, even classes having non-consecutive values of C which denotes the class index as defined in equation (19). The information of which classes are merged is provided by sending for each of the 25 classes an index $i_C$. Classes having the same index $i_C$ are those that share the same filter coefficients that are coded. The index $i_C$ is coded using a truncated binary binarization method or process, which is described in more detail next.

In a truncated binary (TB) binarization process, the input to the process is a request for a TB binarization for a syntax element with value synVal and cMax. The output of the process is the TB binarization of the syntax element. The bin string of the TB binarization process of a syntax element synVal is specified by equation (21) as follows:

$n = cMax$ $k = Floor(Log\ 2(n))$ $$u = (1 << (k+1)) - n \quad (21)$$

If synVal is less than a value u, the TB bin string is derived by invoking an FL binarization process for synVal with a cMax value equal to $(1 << k) - 1$. Otherwise (synVal is greater than or equal to u), the TB bin string is derived by invoking the FL binarization process for (synVal+u) with a cMax value equal to $(1 << (k+1)) - 1$.

When coding the filter index for each of the 25 classes, cMax is set to the total number of filters after merging.

Similarly to ALF, the forceCoef0 flag is also used. When this flag is equal to 1, a one bit flag, denoted by CodedVarBin for each of the merged groups (all filters to be coded) is further signaled to indicate whether the signaled filter coefficients are all zero. Moreover, when this flag is equal to 1, the predictively coding, that is, coding the difference between current filter and previously coded filter is disabled.

It should be noted that when prediction from fixed filters is allowed, the filters to be signaled/coded mentioned above are the differences between the filter applied to the reconstructed image and the selected fixed filter.

Other information, such as coefficients can be coded in the same way as in JEM2.0.

As discussed above, the current ALF and GALF designs have several limitations. One tradeoff to keep in mind is that if a larger filter support is used to minimize distortion, that may increase number of bits (e.g., overhead) to send as side information.

For example, for each frame, when ALF or GALF is enabled, one of the three pre-defined filter supports can be selected and signaled. If more filter supports could be selected based on local characteristics, higher coding gain may be achieved. For example, there are several different classes and each of those classes would be coded using the same filter support. However, for a class with little or no direction (e.g., texture), a small filter support may be sufficient, while for other classes such as ones with a vertical direction or strong vertical direction, having more samples along the vertical direction may be more useful than using a symmetric support region.

Moreover, the pre-defined four geometry transformations (e.g., no transformation, diagonal, vertical flip, and rotation) only consider a transposition of 90 degree changes. Since there is no need to signal the geometry transformation index and only one set of filter coefficients needs to be signaled for the four geometry transformations, using more than four geometry transformations may bring additional coding gains.

Also, the classification is dependent on the gradients, which are good at capturing the directional information. However, like the planar mode (0) used in HEVC intra prediction mode (see e.g., FIG. 5), there can be a case that one block has no obvious direction, but with progressive changes along the rows. There can be another case wherein it is a smooth region and pixels within one block may have quite similar sample values. These two different cases of non-direction mode are not distinguished in current ALF/GALF design.

Finally, in the current designs, for both chroma components in a picture, only a single 5×5 diamond-shaped filter is applied. More coding gains can be expected for chroma components if a more flexible scheme of filter supports is allowed. Moreover, by also including the information of the luma components the coding performance of chroma filtering can be improved.

In view of these issues, the present disclosure describes various enhancements to ALF and GALF designs described above, including expanding geometric transformations, more flexible use of multiple filter supports, and improvements in chroma filtering. Details of these enhancements are provided below. It is understood that each of the various aspects described below can be applied individually or, alternatively, in a combination of two or more of these aspects. Moreover, for any of the aspects described below, it can be assumed that the ALF/GALF classification can be based on an M×N block, where M or N is a positive value, for example, 1, 2, or 4.

In a first solution or technique that can be applied to the limitations in the current ALF/GALF designs, multiple filter supports can be used within one coded slice/tile/picture and the filter support can be dependent on the classification results. A slice, tile, picture, or frame can be referred to as a video unit, which in turn can include one or more video blocks. In this first solution or technique, there may not be a need to directly signal the filter support index.

In an example, the filter support can be associated with the class index.

Additionally or alternatively, the filter support may only be associated with a directionality without considering the activity. That is, for each of the quantized directionality indices, one filter support is defined. Accordingly, we can consider both directionality and activity, or just directionality.

Additionally or alternatively, the filter support may only be associated with the directionality index that represents strong directionality, such as D equal to 1 or 3 in equation (17) (e.g., strong patterns such as strong horizontal/vertical or strong diagonal). In this case, for the other classes, they may share the same filter support.

Additionally or alternatively, the filter support may be determined by the encoded/decoded information, for example, intra prediction direction, block partition size, quantization parameter (QP). In an implementation, the filter support shape may be symmetric along the direction which is close to the intra prediction mode direction applied on the current block/pixel. In an implementation, the filter support can be larger if the partition size of the current block/pixel is larger. In an implementation, the filter support can be larger if the QP of the current block is larger. The overhead can be highly dependent on the QP and the size of the filter support may vary based on the size of the QP.

When multiple filter supports are applied for different classes within one coded slice/tile/picture, in one example, the same filter length can be applied and the filter length can be signaled once within one coded slice/tile/picture. The filter length may refer to the number of samples involved in the filtering performed by the particular filter. Additionally or alternatively, the filter length can also be dependent on the filter support. For each filter support, the filter length may need to be signaled.

In a second solution or technique that can be applied to the limitations in the current ALF/GALF designs, multiple filter supports can be used within one coded slice/tile/picture and the filter support can be signaled.

In one example, multiple filter supports for each class/each directionality/each strong directionality are pre-defined through off-line training. One of the selected filter supports for each class/each directionality/each strong directionality can be signaled. In some cases, the signaling or indication of the selected filter support is by way of a corresponding index of the filter support. For example, for directions 0 and 4 it is possible to send (e.g., signal, indicate) the index of the selected filter support.

In another example, if a block-level ALF/GALF scheme is applied (e.g., in coded tree unit (CTU)-level ALF), multiple filter supports for different sizes can be pre-defined, and a group of filter supports can be used as an initial group (e.g., a default group). In block-level ALF/GALF, for each block (e.g., each video block) it is possible to control whether to perform ALF/GALF (enable ALF/GALF for that block) or not perform ALF/GALF (disable ALF/GALF for that block). For CTU-level ALF, each CTU can have a flag to indicate whether ALF/GALF is enabled or disabled.

When applying ALF/GALF on the slice/tile/picture, the group of filter supports can be updated based on the selection frequency of each filter support in the current group of filter support. For example, if the smallest filter support is frequently selected and signaled for previously coded blocks (e.g., coded video blocks), when filtering a current block (e.g., video block), the largest group filter support can be replaced by a smaller filter support of the pre-defined multiple filter supports.

In a third solution or technique that can be applied to the limitations in the current ALF/GALF designs, in the various aspects described above, when the use of multiple filter supports based on local information is enabled, the following two aspects can also apply. First, the merging process of different classes can be applied when the numbers of filter coefficients of two filter supports associated with two classes are the same. Second, when two filters for different classes are associated with different number of filter coefficients, the predictive coding of one filter from the other filter can be disabled.

In a fourth solution or technique that can be applied to the limitations in the current ALF/GALF designs, in addition to the existing geometry transformations (see e.g., FIGS. 11A-11C), a geometry transformation of 45 degree rotation can be further introduced. In one example, the total number of filter coefficients is kept to be the same as those used for other geometry transformations. In another example, the new geometry transformation is not enabled for 'no direction' category, for example, when D is equal to 0 in equation (17).

Figure 12A:
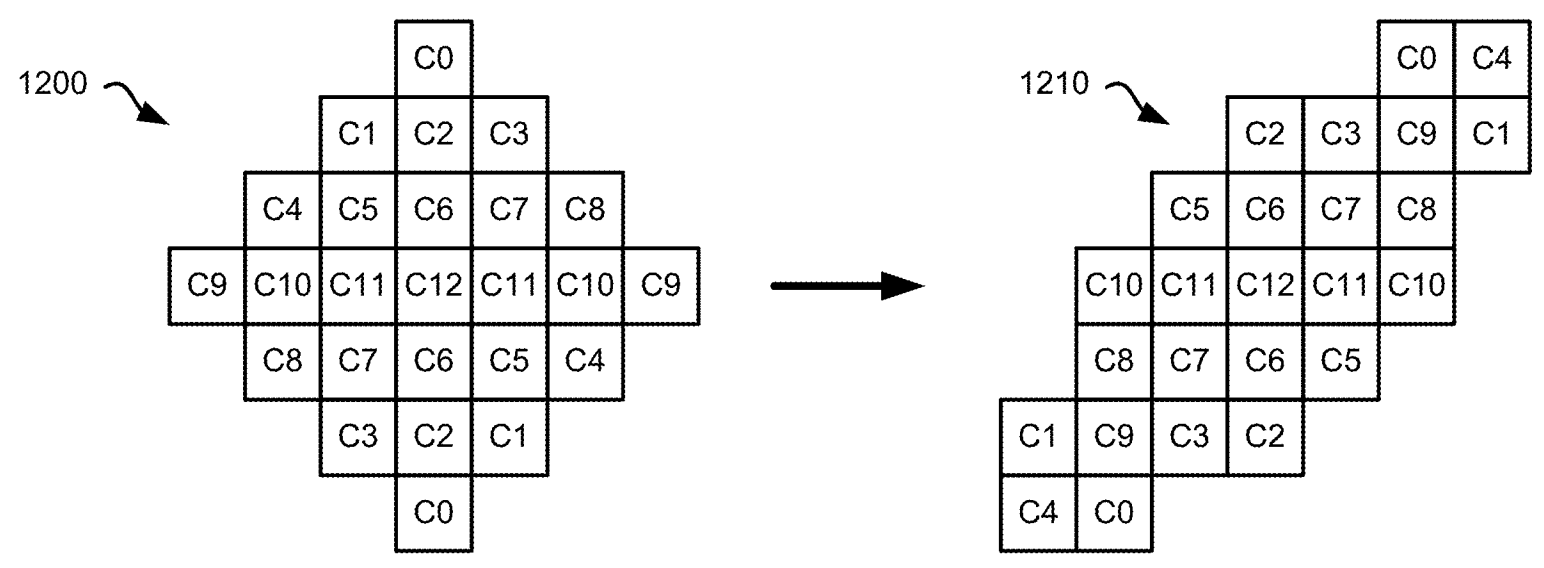

FIGS. 12A and 12B show additional types of geometric transformations for strong diagonal directions. For example, FIG. 12A shows a diagram 1200 of a 7×7 diamond-shaped filter support (no transformation) and a diagram 1210 of the geometrically transformed 7×7 diamond-shaped filter for D equal to 3 (see e.g., equation (17)) and $g_{d2} > g_{d1}$ (see e.g., equations (13) and (14)). FIG. 12B shows a diagram 1220 of a 7×7 diamond-shaped filter support (similar to the one in FIG. 12A) and a diagram 1230 of the geometrically transformed 7×7 diamond-shaped filter for D equal to 3 (see e.g., equation (17)) and $g_{d2} > g_{d1}$ (see e.g., equations (13) and (14)). For the geometrically transformed 7×7 diamond-shaped filter in the example in FIG. 12B, a reduced number of filter coefficients may be needed in comparison to the geometrically transformed 7×7 diamond-shaped filter in the example shown in FIG. 12A.

Figure 13:
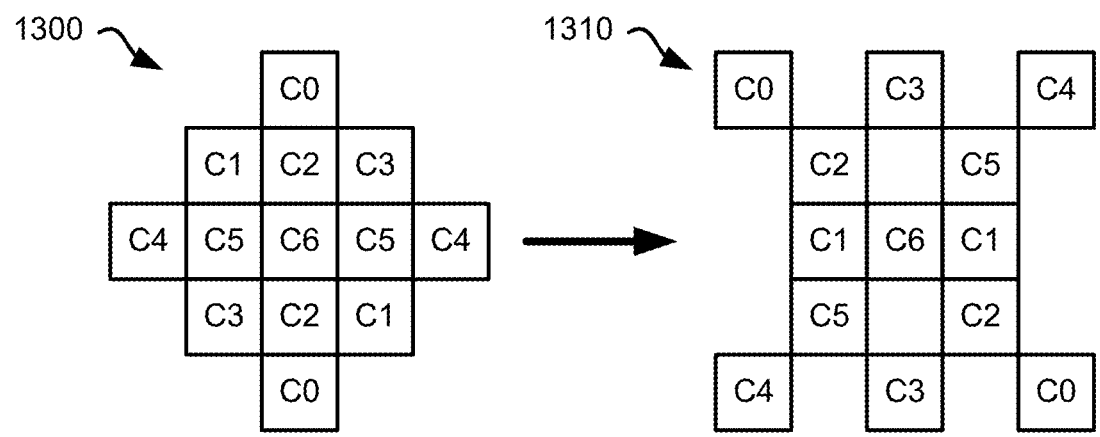
FIG. 13 is a diagram illustrating an example of a 45 degree rotation geometric transformation, in accordance with various aspects of the disclosure.

FIG. 14 illustrates an example of a 45 degree rotation geometric transformation. Diagram 1300 in FIG. 13 shows a 5×5 diamond-shaped filter support (no transformation) and diagram 1310 shows the geometrically transformed 5×5 diamond-shaped filter after the 45 degree rotation geometric transformation.

In a fifth solution or technique that can be applied to the limitations in the current ALF/GALF designs, a new rule can be introduced in the classification process in which energies of a current row and neighboring rows and/or a current column and neighboring columns are evaluated (e.g., determined or identified).

In an example, the energy of one row/column can be defined as the smoothness of one row/column/block is evaluated.

In another example, the energy of one row/column can be defined as an average function of values of consecutive samples including the current pixel.

In another example, two or more categories can be defined based on the similarities of energies of neighboring rows/columns. That is, it is possible to introduce additional categories or classes based on the similarities of the energies. For example, if the differences between neighboring rows/columns are not close to 0, after potential quantization, the N×N block can be classified into one category, otherwise when the differences are close to 0, the N×N block can be classified into another category.

Additionally or alternatively, this new rule may be applied only when one block is classified to be 'no direction' category, that is, when D is equal to 0 in equation (17).

Additionally or alternatively, the classification process can be operated in transform domain, where a transform process is first applied on a certain block covering the current pixel/block, and then the classification can be derived using the low-frequency transform coefficients. For example, different classification indices can be applied if there is only one significant DC coefficient (flat image region), or there is one (or two or a few) significant low frequency coefficients as well (smoothly varying image region).

In a sixth solution or technique that can be applied to the limitations in the current ALF/GALF designs, a new rule can be introduced for the classification in which the values of neighboring pixels and a current pixel are checked. In this new rule, the total number of neighboring pixels can be denoted by Cnt.

In an example, the neighboring pixels are defined as the four neighboring pixels located as above, left, below and right side of current pixel.

In another example, the rule is defined as the number of neighboring pixels with larger sample values than the sample value of current pixel, denote such a number by K (being 0 . . . Cnt, inclusively). K may be further quantized to be $\hat{K}$, e.g, $\hat{K}=(K>3)$? 1:0 or $\hat{K}=(K>4)$? 2:(K>3? 1:0).

Additionally or alternatively, this new rule can be defined as the number of neighboring pixels with smaller sample values than the sample value of current pixel.

In an example, this new rule may only be used for classes with high variances, such as when A or $\hat{A}$ in equation (18) is not smaller than M (M starting from 0).

Additionally or alternatively, $\hat{A}$ may be extended by considering this new rule, as described below in equation (22):

$$\hat{A} = \begin{cases} \hat{A} & \hat{A} < M \\ M + b * \hat{K}_{max} + \hat{K} & \hat{A} == M + b \end{cases} \quad (22)$$

wherein $\hat{K}_{max}$ denotes the maximum value of $\hat{K}$, M and b are two non-negative integer values.

Additionally or alternatively, the class index C derived in equation (19) can be modified to: $D+5*\hat{A}$.

In a seventh solution or technique that can be applied to the limitations in the current ALF/GALF designs, the various solutions or techniques described above, which can be applied to the processing or filtering of luma components, can also be applied to both chroma components, individually or in any combination of them. In one example, a first chroma component can be the Cb chroma component and a second chroma component can be the Cr chroma component.

In an eighth solution or technique that can be applied to the limitations in the current ALF/GALF designs, chroma filtering control can be performed at a block level (e.g., block-level control) instead of at a slice level as is done in the current design.

In an example, the on/off control (of the block-level chroma filtering) can be predicted or determined from the filtering enabled or disabled associated with the corresponding luma block.

In another example, the use of on/off control flags (indicating the block-level chroma filtering) can be signaled. In an implementation, the two color components (e.g., the two chroma components) can have separate on/off control flags. Alternatively, the on/off control flags can be shared between the two color components.

In a ninth solution or technique that can be applied to the limitations in the current ALF/GALF designs, rather than just using the chroma neighboring samples in adaptive loop filter, the samples of corresponding luma component can be used as the reference samples to improve the coding performance of chroma filtering.

In an example, the filter for chroma components can be configured to minimize the error between the original chroma signal (sample/pixel) and the decoded filtered luma signal (sample/pixel).

In another example, for 4:4:4 color format, the pixels/samples $\hat{I}_{i,j}$ as shown in equation (10) are those corresponding to the pixels/samples in luma component. The corresponding pixels in the luma components are those pixels at the same sampling position. That is, it may be possible to replace neighboring chroma samples by collocated luma samples.

In the example above, the corresponding luma samples are used to improve the quality of chroma filter. However, for some color formats where the luma and chroma resolutions are different, such as for 4:2:0 color format, the sampling position of luma and chroma pixels are not aligned. Therefore, different methods are needed to derive the corresponding luma pixels.

Figure 14A:
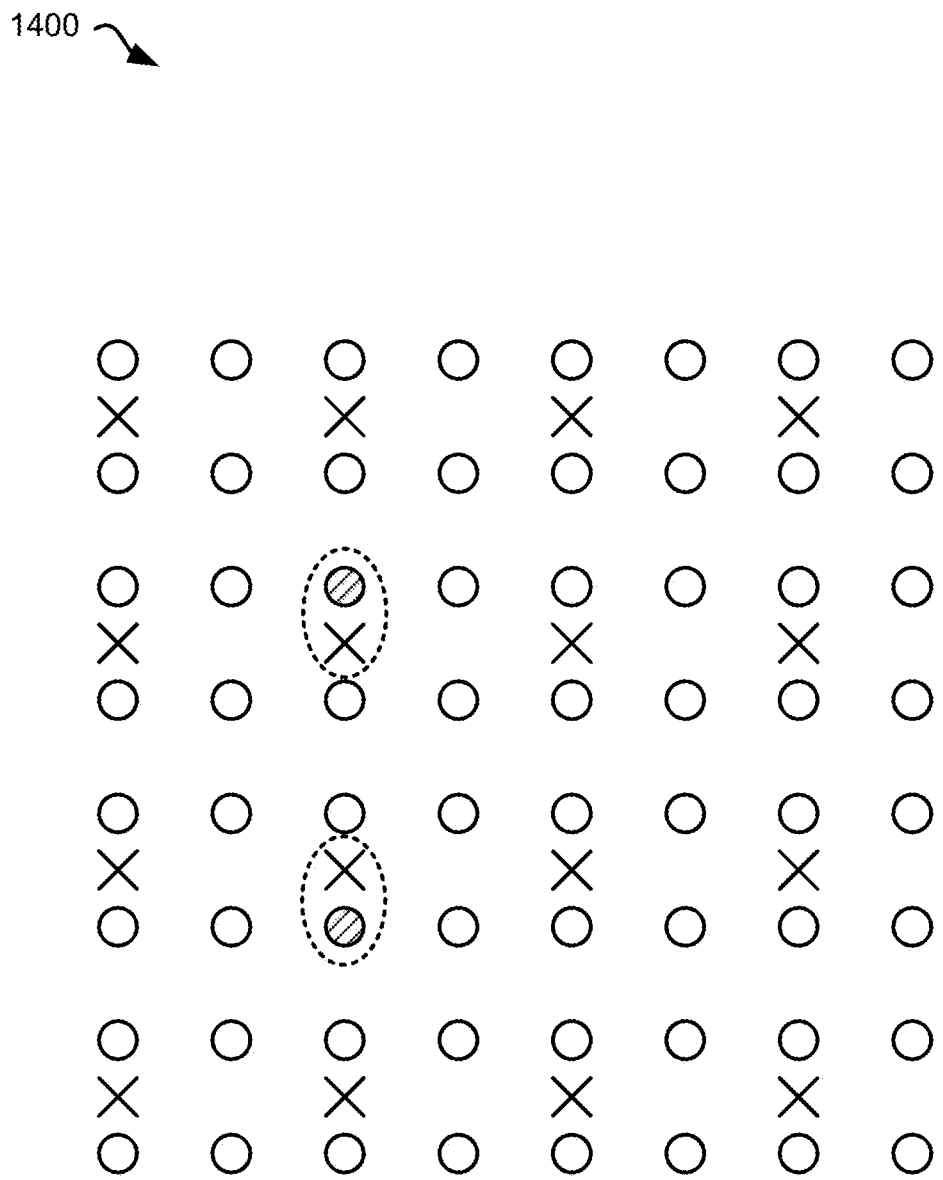
FIG. 14A is a diagram illustrating an example of sampling locations of luma and chroma samples in a picture for 4:2:0 color format, in accordance with various aspects of the disclosure.

In another example for color format different from 4:4:4, the correspondence between non-collocated luma and chroma samples are shown by dotted circles in diagram 1400 in FIG. 14A. One correspondence is to relate the luma samples located immediately above to the chroma samples.

That is, the value of the luma sample to be used is the value of the luma sample immediately above the chroma sample. Another correspondence is to relate the luma samples located immediately below to the chroma samples. That is, the value of the luma sample to be used is the value of the luma sample immediately below the chroma sample. The dotted circles in FIG. 14A show a case in which the correspondence is with an luma sample above a chroma sample and a different case in which the correspondence is with a luma sample below a chroma sample.

Figure 14B:
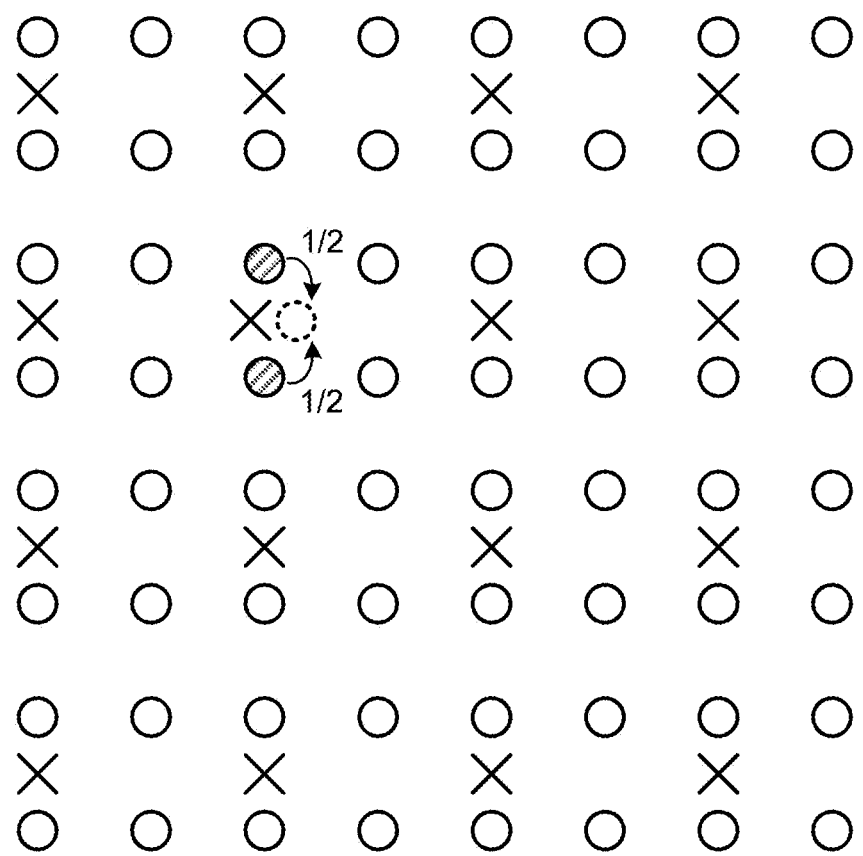
FIGS. 14B and 14C are diagrams illustrating examples of the generation of correspondent cross-component pixels for 4:2:0 color format, in accordance with various aspects of the disclosure.

In another example, as described in diagram 1410 in FIG. 14B, the luma pixels or samples located immediately above and below a current chroma pixel or sample are used to generate a virtual luma pixel or sample using a predefined weighting factors (e.g., ½ and ½).

Figure 14C:
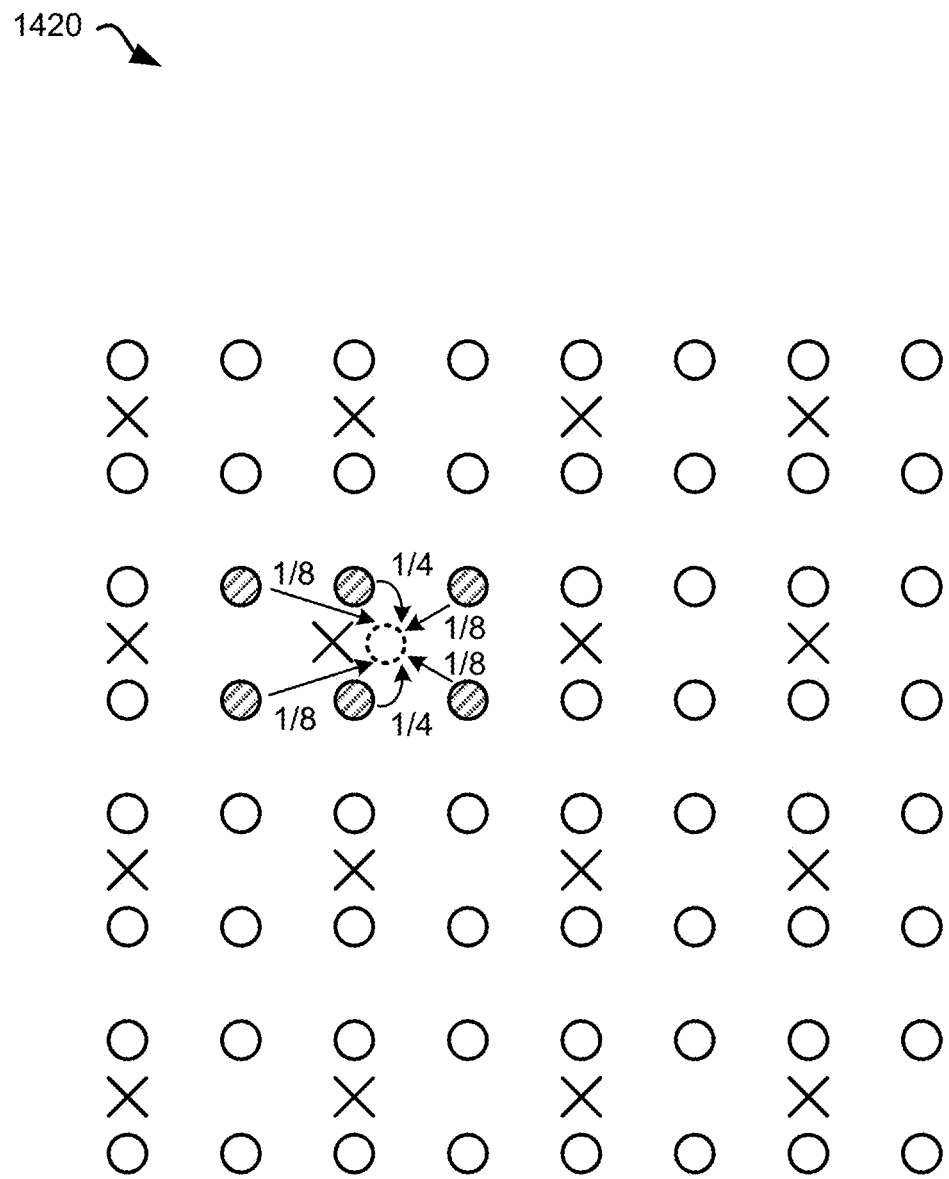

In another example, as described in diagram 1420 in FIG. 14C, the six luma pixels or samples surrounding a current chroma pixel or sample are used to generate a virtual luma pixel or sample using a predefined weighting factors. It is to be understood that the weighting factors and/or the number of surrounding or neighboring pixels can be different from those shown in FIG. 14C.

Additionally or alternatively, a filter offset o shown in equation (10) is not derived. Instead, the filter offset can be signaled as part of a bitstream. In one example, the signaling method may be the same as that for coding other filter coefficients.

Additionally or alternatively, the assumption used in ALF/GALF that sum of all filter coefficients is equal to 1 (in floating precision) or equal to $2^K$ (in integer precision) may not apply. That is because the original filters were based on using the same color components, and the proposed approach uses luma components to predict chroma components. Therefore, all the filter coefficients (including the DC filter coefficients) may need to be signaled. Alternatively, when symmetric filter support is utilized, only non-redundant filter coefficients need to be signaled.

Additionally or alternatively, the neighboring luma samples as well as the current decoded chroma sample before ALF/GALF can both be used in the filtering process.

As used herein the terms "luma" and "luma component" as well as the terms "chroma" and "chroma components" can be sued interchangeably. As noted above, the terms "pixels" and "samples" can also be used interchangeably. Accordingly, the terms "luma samples" or "luma pixels" can refer to "luma component samples", and the terms "chroma samples" or "chroma pixels" can refer to "chroma component samples".

In a tenth solution or technique that can be applied to the limitations in the current ALF/GALF designs relates to the coding of filter index. The total number of filters after merging can be denoted by TotalCnt (larger or equal to 1), a class index by C (starting from 0), and a filter index of the class with index equal to C by $i_C$. Note that $i_C$ can be within [0, TotalCnt−1], inclusively.

In this solution or technique, it is proposed that when C is smaller than cTotalCnt, $i_C$ may not be larger than C.

Additionally or alternatively, if the truncated binary binarization method described above is used to code the filter indices, the input parameter cMax can be modified to be min(C, TotalCnt) instead of being fixed as TotalCnt. Here, the function min (•) returns the smaller value of the two input parameters.

Additionally or alternatively, the signaling of filter index for the class with C equal to 0 can be skipped. In this case, the filter index is derived to be 0.

Based on the various solutions or techniques described above, additional details regarding devices, systems, and methods associated with those solutions or techniques are described in more detail below with respect to FIGS. 15-21. Moreover, it is to be understood that when using the term "ALF" it may refer to "ALF" or to "GALF" according to the context. Accordingly, when indicating that the solutions or techniques described above provide enhancements to "ALF" it may refer that such solutions or techniques provide enhancements to "ALF", "GALF", or both, based on the type of enhancement being provided.

FIG. 15 shows an example of a processing system 1500 configured to perform various ALF and GALF aspects described herein. The processing system 1500 may correspond to, for example, one of the wireless communication devices 115-*a* and 115-*b* shown in FIG. 3. In this regard, the device 1500 may implement a source device 12 with a video encoder 20 and an ALF unit 64, a destination device 14 with a video decoder 30 and an ALF unit 92, or both a source device 12 and a destination device 14 with respective video decoder and encoder and ALF units.

The components and subcomponents of the processing system 1500 may be configured to implement or perform one or more methods (e.g., methods 1600, 1700, 1800, 1900, 2000, and 2100 in FIGS. 16-21, respectively) described herein in accordance with various aspects of the present disclosure. In particular, the components and subcomponents of the processing system 1500 may perform techniques for enhancing ALF and GALF operations.

An example of the processing system 1500 may include a variety of components such as a memory 1503, one or more processors 1505, and a transceiver 1509, which may be in communication with one another via one or more buses, and which may operate to enable one or more of the ALF and GALF functions and/or operations described herein, including one or more methods of the present disclosure.

The transceiver 1509 may include a receiver (RX) 1508*a* configured to receive information representative of video data (e.g., receive encoded bitstream with coded video data from a source device). Additionally or alternatively, the transceiver 1509 may include a transmitter (TX) 1508*b* configured to transmit information representative of video data (e.g., transmit encoded bitstream with coded video data to a receiving or destination device). The receiver 1508*a* may be a radio frequency (RF) device and may be configured to demodulate signals carrying the information representative of the video data in accordance with a cellular or some other wireless communication standard. Similarly, the transmitter 1508*b* may be an RF device and may be configured to modulate signals carrying the information representative of the video data in accordance with a cellular or some other wireless communication standard.

The various functions and/or operations described herein may be included in, or be performed by, the one or more processors 1505 and, in an aspect, may be executed by a single processor, while in other aspects, different ones of the functions and/or operations may be executed by a combination of two or more different processors. For example, in an aspect, the one or more processors 1505 may include any one or any combination of an image/video processor, a modem processor, a baseband processor, or a digital signal processor.

The one or more processors 1505 may be configured to perform or implement the video encoder 20 and its respective ALF unit 64, the video decoder 30 and its respective ALF unit 92, or both the video encoder 20 and the video decoder 30. Alternatively, the one or more processors 1505 may include a modem 1507, which may be configured to perform or implement the video encoder 20 and its respective ALF unit 64, the video decoder 30 and its respective ALF unit 92, or both the video encoder 20 and the video decoder 30.

The ALF unit 64 and the ALF unit 92 may each include one or more of the subcomponents shown in FIG. 15. In one implementation, each of the subcomponents shown are included in both the ALF unit 64 and the ALF unit 92, where each of these subcomponents can be enabled or disabled in a manner that is consistent with having any encoding features or operations performed using the ALF unit 64 have corresponding decoding features or operations performed using the ALF unit 92.

The ALF units 64/92 can include one or more of a multiple filter support component 1510, a multiple filter support signaling component 1520, a local information component 1530, a 45 degree rotation component 1540, a classification rules component 1550, a luma and chroma application component 1560, a chroma block-level control component 1570, or a luma samples in chroma filtering component 1580. Each of these subcomponents can be implemented solely in hardware, solely in software, or in a combination of hardware and software. Moreover, the features or functions of two or more of these subcomponents can be combined into The multiple filter support component 1510 may be configured to perform one or more of the features or functions described above in connection with having multiple filter supports used with one coded slice/tile/picture, and where the filter support can be based on classification results.

The multiple filter support signaling component 1520 may be configured to perform one or more of the features or functions described above in connection with having multiple filter supports used with one coded slice/tile/picture, and where the filter support can be signaled (e.g., signaled from a video encoder 20 in a source device 12 to a video decoder 30 in a destination device 14). In some implementations, aspects of the multiple filter support component 1510 and of the multiple filter support signaling component 1520 can be combined into a single component.

The local information component 1530 may be configured to perform one or more of the features or functions described above in connection with enabling the use of multiple filter supports based on local information.

The 45 degree rotation component 1540 may be configured to perform one or more of the features or functions described above in connection with using geometry transformations having a 45 degree rotation.

The classification rules component 1550 may be configured to perform one or more of the features or functions described above in connection with introducing new rules in the classification process for ALF or GALF, where the new rules involve evaluating the energy of rows and/or columns, checking the values of neighboring pixels, or both.

The luma and chroma application component 1560 may be configured to perform one or more of the features or functions described above in connection with having methods that apply to luma components also apply to chroma components, individually or in combination.

The chroma block-level control component 1570 may be configured to perform one or more of the features or functions described above in connection with having block-level control of chroma filtering.

The luma samples in chroma filtering component 1580 may be configured to perform one or more of the features or functions described above in connection with using samples of corresponding luma components to improve the coding performance of chroma filtering.

The memory 1503 may be configured to store data used herein and/or local versions of applications being executed by at least one processor 1505. The memory 1503 may include any type of computer-readable medium usable by a computer or at least one processor 1505, such as random access memory (RAM), read only memory (ROM), tapes, magnetic discs, optical discs, volatile memory, non-volatile memory, and any combination thereof. In an aspect, for example, the memory 1503 may be a non-transitory computer-readable storage medium that stores one or more computer-executable codes that may be executed by the one or more processors 1505 to implement or perform the various ALF and GALF functions and/or operations described herein.

For clarity and without limitation, the methods in FIGS. 16-21 may be described below with reference to one or more of the aspects discussed above with reference to at least FIGS. 1, 2A, 2B, 3, 8A-8C, 9, 10, 11A-11C, 12A, 12B, 13, 14A-14C, and 15.

Figure 16:
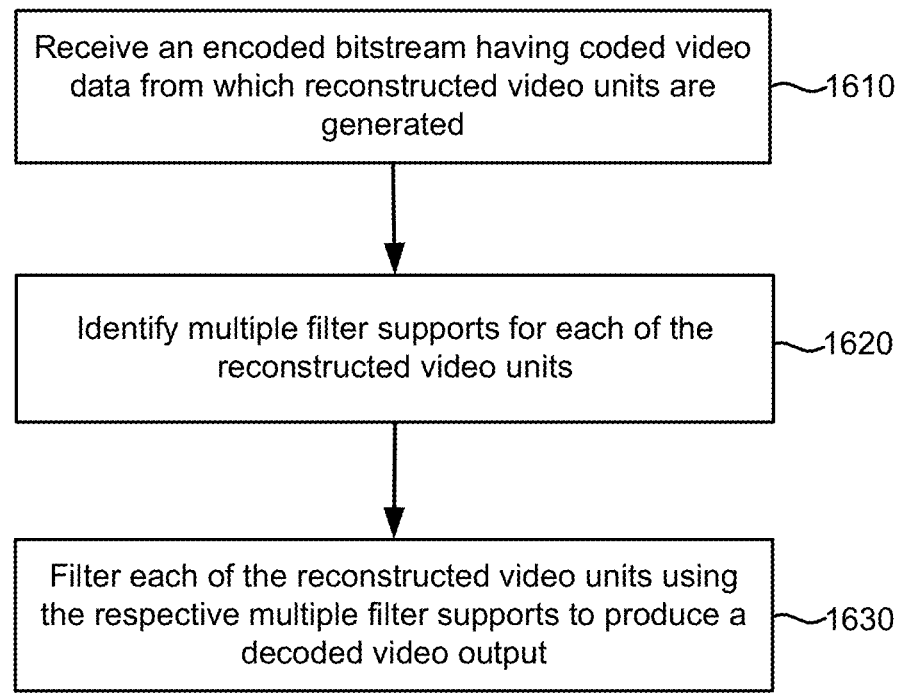
FIG. 16 is a flow diagram illustrating an example of a decoding method with multiple filter supports, in accordance with various aspects of the disclosure.

FIG. 16 is a flow diagram illustrating an example of a method 1600 for decoding video data using multiple filter supports within one slice, tile, picture, or frame in ALF/GALF. Aspects of the method 1600 can be performed or implemented by the destination device 14, the video decoder 30, the ALF unit 92, the processing system 1500, and/or the processor(s) 1505.

At block 1610, the method 1600 includes receiving an encoded bitstream having coded video data from which reconstructed video units are generated. In an aspect, each reconstructed video unit corresponds to a video slice, a video tile, a video picture, or a video frame.

At block 1620, the method 1600 includes identifying multiple filter supports for each of the reconstructed video units.

At block 1630, the method 1600 includes filtering each of the reconstructed video units using the respective multiple filter supports to produce a decoded video output.

In another aspect of the method 1600, identifying multiple filter supports for each of the reconstructed video units includes identifying, for each of multiple video blocks within one of the reconstructed video units, a different filter support, and filtering each of the reconstructed video units includes filtering each of the multiple video blocks within the one reconstructed video unit using one of the respective filter supports.

In another aspect of the method 1600, identifying multiple filter supports for each of the reconstructed video units includes classifying multiple video blocks within one of the reconstructed video units, each of multiple classes in the classification being associated with a unique filter support.

In another aspect of the method 1600, identifying multiple filter supports for each of the reconstructed video units includes identifying, for multiples video blocks within one of the reconstructed video units, a different filter support, each of the filter supports for the multiple video blocks being associated with a directionality or a strong directionality, being based on information decoded from the one reconstructed video unit, or a combination thereof. In an aspect, the information decoded from the one reconstructed video unit includes one or more of intra-prediction direction information, block partition size information, or quantization parameter (QP) information.

In another aspect of the method 1600, the method further includes receiving, along with the encoded bitstream having the coded video data and for each reconstructed video unit, an indication of a filter length to be similarly applied to all of the multiple filter supports.

In another aspect of the method 1600, the method further includes receiving, along with the encoded bitstream having the coded video data and for each reconstructed video unit, one or more indications of filter length to be applied to each of the multiple filter supports.

In another aspect of the method 1600, the method further includes receiving, along with the encoded bitstream having the coded video data and for each reconstructed video unit, an indication of each of the multiple filter supports, where identifying the multiple filter supports for each of the reconstructed video units is based at least on the indication. In an aspect, each of the multiple filter supports is from a pre-defined group of filter supports selected through off-line training. In another aspect, each of the multiple filter supports is associated with one or more classes, one or more directionalities, or one or more strong directionalities. In yet another aspect, for the pre-defined group of filter supports, one of the multiple filter supports associated with the reconstructed video unit is different from another of the multiple filter supports associated with the reconstructed video unit. Moreover, for each of the multiple filter supports, the method may further include receiving an indication of a selected filter support from the pre-defined group.

In another aspect of the method 1600, for each size of a video block in one of the reconstructed video units, the multiple filter supports are from a pre-defined, a current group of filter supports being associated with the video block size, and the current group being dynamically updated based on selection frequency of each filter support in the current group.

In another aspect of the method 1600, identifying multiple filter supports for each of the reconstructed video units includes classifying multiple video blocks within each reconstructed video unit, and merging between different classes associated with the classification is applicable when a number of filter coefficients are the same for each of two different filter supports associated with two different classes.

In another aspect of the method 1600, the method further includes disabling predictive coding when a number of filter coefficients are different for each of two different filters associated with two different classes, disabling predictive coding including disabling predictive coding of one of the two filters from the other filter.

In another aspect of the method 1600, the method further includes identifying a geometric transformation having a 45 degree rotation from a group of geometric transformations, wherein the geometric transformation is applied to filter coefficients of a respective one of the multiple filter supports in connection with the filtering. In some implementations, a same number of filter coefficients is associated with the geometric transformation having the 45 degree rotation and with the other geometric transformations in the group of geometric transformations. In some implementations, the method further includes disabling the geometric transformation having the 45 degree rotation when an associated directionality indicates that there is no direction.

In another aspect of the method 1600, identifying multiple filter supports for each of the reconstructed video units includes classifying multiple video blocks within each reconstructed video unit based at least in part on evaluating one or more of an energy of a current row, an energy of a current column, an energy of a neighboring row, or an energy of a neighboring column. In some implementations, the energy of a current row or column, or the energy of a neighboring row or column, is defined as a smoothness of the respective row or column, or an average function of values of consecutive samples including a current pixel of the respective row or column. In some implementations, the classification of a video block of the multiple video blocks is based at least on an evaluation of energy when a directionality of the respective video block indicates that there is no direction.

In another aspect of the method 1600, identifying multiple filter supports for each of the reconstructed video units includes classifying multiple video blocks within each reconstructed video unit based at least in part on a value of a current pixel in a current video block of the multiple video blocks, and a value of neighboring pixels to the current pixel. In some implementations, the neighboring pixels include four neighboring pixels located above, left, below, and right of the current pixel, adjacent pixels to the current pixel that have values greater than a value of the current pixel, or adjacent pixels to the current pixel that have values smaller than a value of the current pixel.

In another aspect of the method 1600, filtering each of the reconstructed video units using the respective multiple filter supports to produce a decoded video output includes filtering one or more of each reconstructed video unit, first chroma components (e.g., Cb or Cr) of each reconstructed video unit, second chroma (e.g., Cr or Cb) components of each reconstructed video unit, first chroma components and second chroma components of each reconstructed video unit, or a combination thereof.

Figure 17:
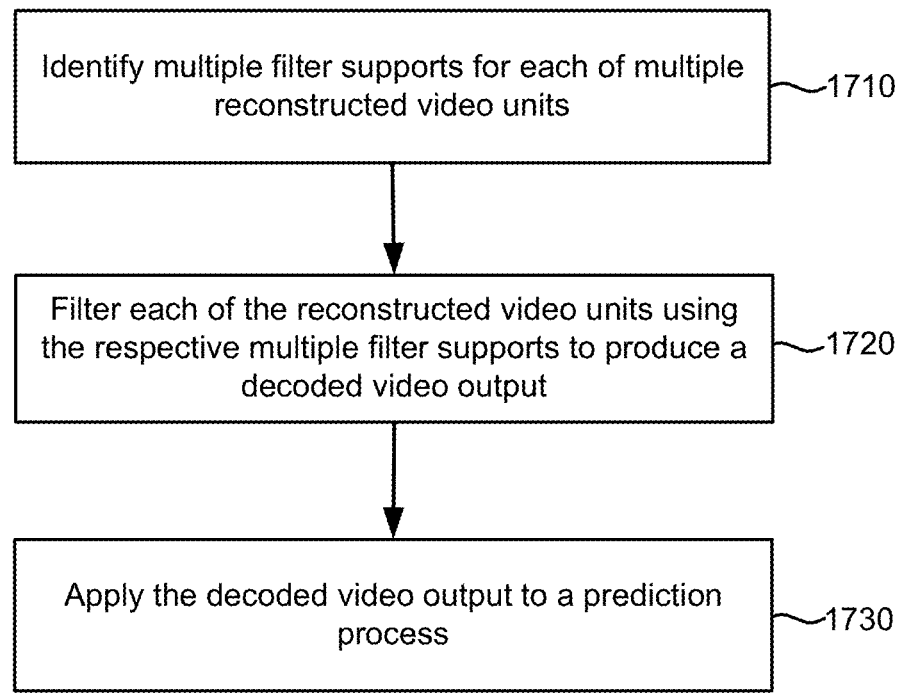
FIG. 17 is a flow diagram illustrating an example of an encoding method with multiple filter supports, in accordance with various aspects of the disclosure.

FIG. 17 is a flow diagram illustrating an example of a method 1700 for encoding video data using multiple filter supports within one slice, tile, picture, or frame in ALF/GALF. Aspects of the method 1700 can be performed or implemented by the source device 12, the video encoder 20, the ALF unit 64, the processing system 1500, and/or the processor(s) 1505.

At block 1710, the method 1700 includes identifying multiple filter supports for each of multiple reconstructed video units. Each reconstructed video unit corresponds to a video slice, a video tile, a video picture, or a video frame.

At block 1720, the method 1700 includes filtering each of the reconstructed video units using the respective multiple filter supports to produce a decoded video output.

At block 1730, the method includes applying the decoded video output to a prediction process (e.g., applied to prediction processing unit 41 in the video encoder 20).

In an aspect of the method 1700, identifying multiple filter supports for each of the reconstructed video units includes identifying, for each of multiple video blocks within one of the reconstructed video units, a different filter support, and filtering each of the reconstructed video units includes filtering each of the multiple video blocks within the one reconstructed video unit using one of the respective filter supports.

In an aspect of the method 1700, the method further includes generating an indication (e.g., signaling) of each of the multiple filter supports, and transmitting, along with an encoded bitstream having coded video data, the indication.

In an aspect of the method 1700, identifying multiple filter supports for each of the reconstructed video units includes classifying multiple video blocks within each reconstructed video unit, and merging between different classes associated with the classification is applicable when a number of filter coefficients are the same for each of two different filter supports associated with two different classes.

In another aspect of the method 1700, the method further includes identifying a geometric transformation having a 45 degree rotation from a group of geometric transformations, where the geometric transformation is applied to filter coefficients of a respective one of the multiple filter supports in connection with the filtering.

In another aspect of the method 1700, identifying multiple filter supports for each of the reconstructed video units includes classifying multiple video blocks within each reconstructed video unit based at least in part on evaluating one or more of an energy of a current row, an energy of a current column, an energy of a neighboring row, or an energy of a neighboring column.

In another aspect of the method 1700, identifying multiple filter supports for each of the reconstructed video units includes classifying multiple video blocks within each reconstructed video unit based at least in part on a value of a current pixel in a current video block of the multiple video blocks, and a value of neighboring pixels to the current pixel.

In another aspect of the method 1700, filtering each of the reconstructed video units using the respective multiple filter supports to produce a decoded video output includes filtering one or more of luma components of each reconstructed video unit, first chroma components (e.g., Cb or Cr) of each reconstructed video unit, second chroma (e.g., Cr or Cb) components of each reconstructed video unit, first chroma components and second chroma components of each reconstructed video unit, or a combination thereof.

Figure 18:
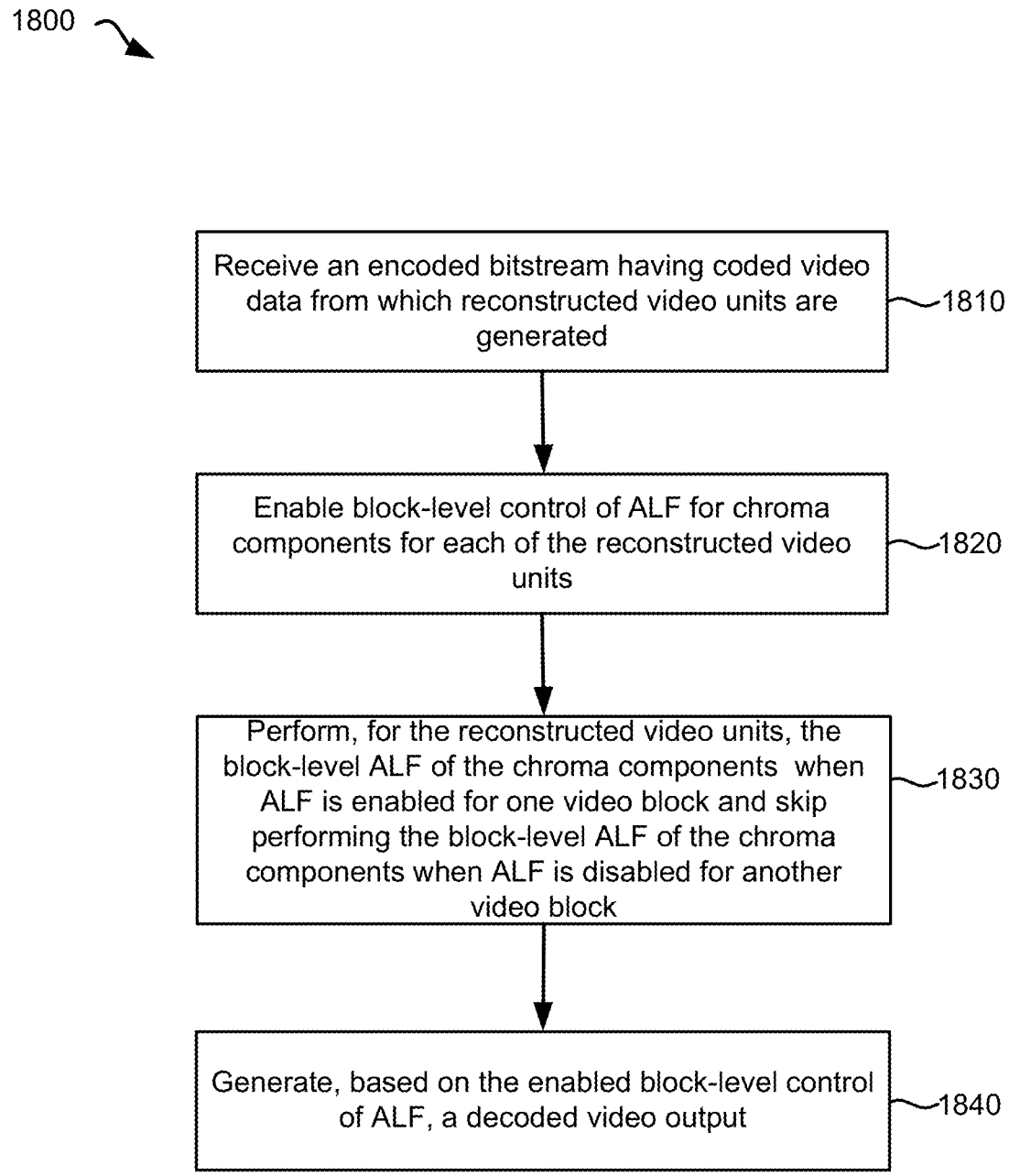
FIG. 18 is a flow diagram illustrating an example of a decoding method with block-level control of chroma filtering, in accordance with various aspects of the disclosure.

FIG. 18 is a flow diagram illustrating an example of a method 1800 for decoding video data using block-level control of chroma filtering in ALF/GALF. Aspects of the method 1800 can be performed or implemented by the destination device 14, the video decoder 30, the ALF unit 92, the processing system 1500, and/or the processor(s) 1505.

At block 1810, the method 1800 includes receiving an encoded bitstream having coded video data from which reconstructed video units are generated. Each reconstructed video unit corresponds to a video slice, a video tile, a video picture, or a video frame.

At block 1820, the method 1800 includes enabling block-level control of ALF (or GALF) for chroma components for each of the reconstructed video units. In an aspect, the block-level control of ALF includes filtering of one or more video blocks within each reconstructed video unit and not filtering one or more video blocks within each reconstructed video unit. In another aspect, chroma components refers to a first chroma component (e.g., Cb), a second chroma component (e.g., Cr), or both the first chroma component and the second chroma component.

At block 1830, the method 1800 includes performing, for the reconstructed video units, the block-level ALF for the chroma components when ALF is enabled for one video block and skip performing the block-level ALF for the chroma components when ALF is disabled for another video block.

At block 1840, the method 1800 includes generating, based on the enabled block-level control of ALF, a decoded video output.

In an aspect of the method 1800, enabling block-level control of ALF includes enabling or disabling block-level filtering of chroma components for a particular chroma block in one of the reconstructed video units based on enabling or disabling filtering of luma components in a corresponding luma block. In an implementation, in response to enabling the filtering of luma components in the corresponding luma block, enabling the block-level filtering of chroma components for the particular chroma block, or in response to disabling the filtering of luma components in the corresponding luma block, disabling the block-level filtering of chroma components for the particular chroma block.

In an aspect of the method 1800, the method further includes receiving, along with the encoded bitstream having the coded video data, an indication (e.g., signaling) to enable block-level control of ALF of chroma components. In an implementation, the indication can include one or more control flags configured to indicate enabling or disabling of block-level filtering of chroma components for different video blocks. In an implementation, the indication can include a first indication to enable or disable block-level filtering of a first chroma component and a second indication, different from the first indication, to enable or disable block-level filtering of a second chroma component.

Figure 19:
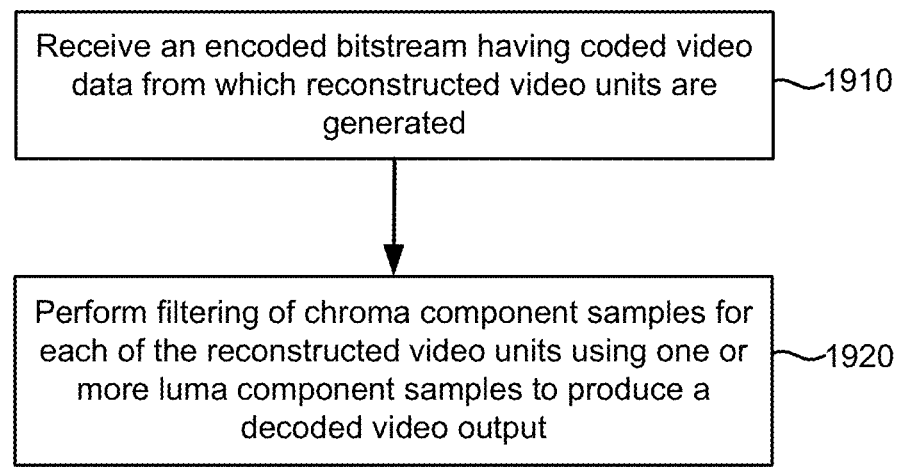
FIG. 19 is a flow diagram illustrating an example of a decoding method with luma samples for chroma filtering, in accordance with various aspects of the disclosure.

FIG. 19 is a flow diagram illustrating an example of a method 1900 for decoding video data using luma samples for chroma filtering in ALF/GALF. Aspects of the method 1900 can be performed or implemented by the destination device 14, the video decoder 30, the ALF unit 92, the processing system 1500, and/or the processor(s) 1505.

At block 1910, the method 1900 includes receiving an encoded bitstream having coded video data from which reconstructed video units are generated.

At block 1920, the method 1900 includes performing filtering of chroma component samples for each of the reconstructed video units using one or more luma component samples to produce a decoded video output.

In an aspect of the method 1900, performing filtering of chroma component samples for each of the reconstructed video units using one or more luma component samples includes using corresponding luma component samples as reference samples.

In an aspect of the method 1900, a filter for performing the filtering of chroma component samples is configured to minimize an error between an original chroma component sample and a decoded, filtered luma component sample.

In an aspect of the method 1900, for 4:4:4 color format, each chroma component sample to be filtered is a corresponding luma component sample.

In an aspect of the method 1900, for 4:2:0 color format a chroma component sample is related to a luma component sample located immediately above the chroma component sample (see e.g., FIG. 14A), a chroma component sample is related to a luma component sample located immediately below the chroma component sample (see e.g., FIG. 14A), a chroma component sample is related to a virtual luma component sample generated from equally weighted luma component samples immediately above and below the chroma component sample (see e.g., FIG. 14B), or a chroma component sample is related to a virtual luma component sample generated from equally weighted luma component samples immediately above and below the chroma component sample, equally weighted luma component samples immediately to the left of the luma component samples immediately above and below the chroma component sample, and equally weighted luma component samples immediately to the left of the luma component samples immediately above and below the chroma component sample (see e.g., FIG. 14C).

In an aspect of the method 1900, the method further includes receiving, along with the encoded bitstream having the coded video data, an indication (e.g., signaling) of an offset for a filter for performing the filtering of chroma component samples.

In an aspect of the method 1900, the method further includes receiving, along with the encoded bitstream having the coded video data, an indication (e.g., signaling) of coefficients for a filter for performing the filtering of chroma component samples, the coefficients including a DC coefficient. The DC coefficient indicates the filter coefficient which is applied to the current chroma sample.

In an aspect of the method 1900, performing filtering of chroma component samples for each of the reconstructed video units using one or more luma component samples includes using neighboring luma component samples with a chroma component sample.

Figure 20:
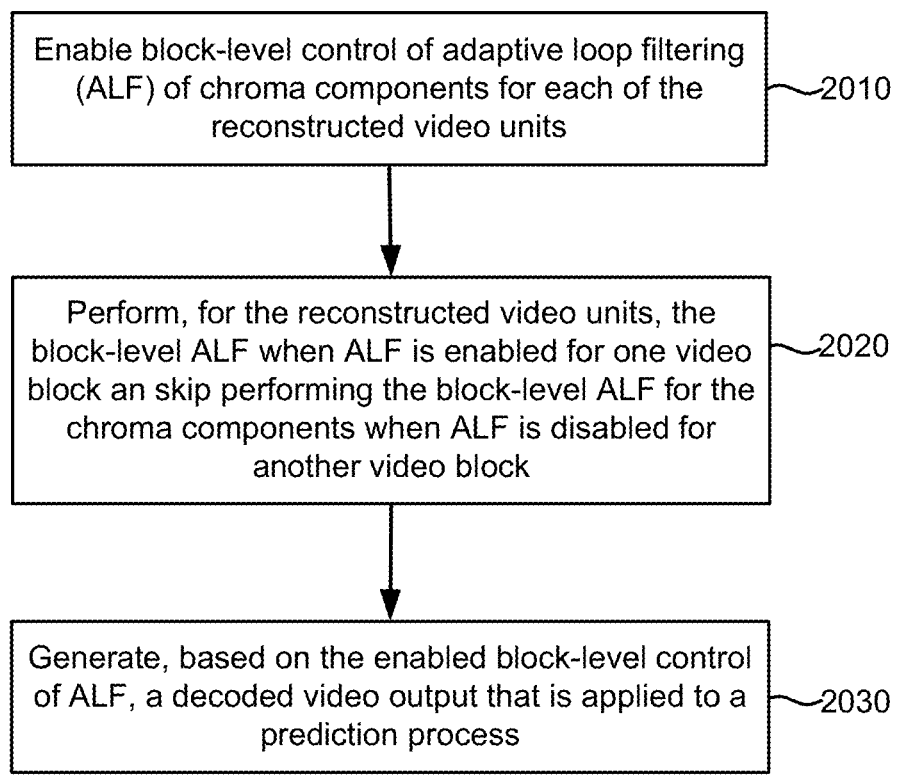
FIG. 20 is a flow diagram illustrating an example of an encoding method with block-level control of chroma filtering, in accordance with various aspects of the disclosure.

FIG. 20 is a flow diagram illustrating an example of a method 2000 for encoding video data using block-level control of chroma filtering in ALF/GALF. Aspects of the method 2000 can be performed or implemented by the source device 12, the video encoder 20, the ALF unit 64, the processing system 1500, and/or the processor(s) 1505.

At block 2010, the method 2000 includes enabling block-level control of ALF (or GALF) of chroma components for each of the reconstructed video units. Each reconstructed video unit corresponds to a video slice, a video tile, a video picture, or a video frame.

At block 2020, the method 2000 includes performing, for the reconstructed video units, the block-level ALF when ALF is enabled for one video block an skip performing the block-level ALF for the chroma components when ALF is disabled for another video block.

At block 2030, the method 2000 includes generating, based on the enabled block-level control of ALF, a decoded video output that is applied to a prediction process.

In an aspect of the method 2000, enabling block-level control of ALF includes enabling or disabling filtering of chroma components for a particular chroma block in one of the reconstructed video units based on enabling or disabling filtering of luma components in a corresponding luma block.

In an aspect of the method 2000, the method further includes generating an indication (e.g., signaling) to enable block-level control of ALF of chroma components, and transmitting the indication along with an encoded bitstream having coded video data. In some implementations, the indication includes one or more control flags configured to indicate enabling or disabling of block-level filtering of chroma components for different video blocks. In some implementations, the indication includes a first indication to enable or disable block-level filtering of a first chroma component and a second indication, different from the first indication, to enable or disable block-level filtering of a second chroma component.

Figure 21:
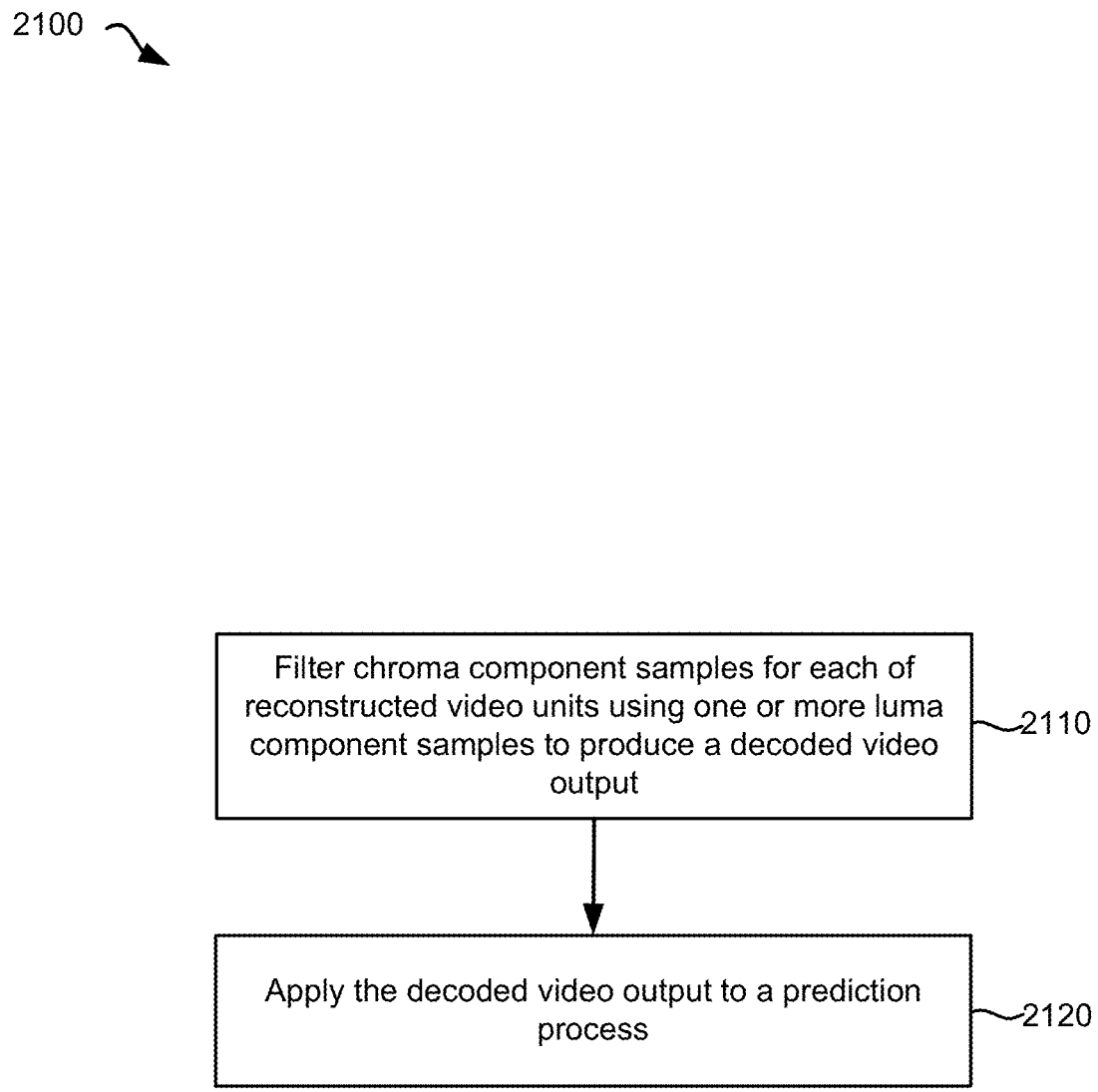
FIG. 21 is a flow diagram illustrating an example of an encoding method with luma samples for chroma filtering, in accordance with various aspects of the disclosure.

FIG. 21 is a flow diagram illustrating an example of a method 2100 for encoding video data using luma samples for chroma filtering in ALF/GALF. Aspects of the method 2100 can be performed or implemented by the source device 12, the video encoder 20, the ALF unit 64, the processing system 1500, and/or the processor(s) 1505.

At block 2110, the method 2100 includes filtering chroma component samples for each of reconstructed video units using one or more luma component samples to produce a decoded video output.

At block 2120, the method 2100 includes applying the decoded video output to a prediction process.

In an aspect of the method 2100, for 4:4:4 color format, each chroma component sample to be filtered is a corresponding luma component sample.

In an aspect of the method 2100, for 4:2:0 color format a chroma component sample is related to a luma component sample located immediately above the chroma component sample (see e.g., FIG. 14A), a chroma component sample is related to a luma component sample located immediately below the chroma component sample (see e.g., FIG. 14A), a chroma component sample is related to a virtual luma component sample generated from equally weighted luma component samples immediately above and below the chroma component sample (see e.g., FIG. 14B), or a chroma component sample is related to a virtual luma component sample generated from equally weighted luma component samples immediately above and below the chroma component sample, equally weighted luma component samples immediately to the left of the luma component samples immediately above and below the chroma component sample, and equally weighted luma component samples immediately to the left of the luma component samples immediately above and below the chroma component sample (see e.g., FIG. 14C).

In an aspect of the method 2100, the method further includes transmitting, along with an encoded bitstream having coded video data, an indication (e.g., signaling) of coefficients for a filter to filter the chroma component samples, the coefficients including a DC coefficient. The DC coefficient indicates the filter coefficient which is applied to the current chroma sample.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The disclosure set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The disclosure includes specific details for the purpose of providing an understanding of the described techniques. These techniques, however, may be practiced without these specific details. In some instances, well-known structures and apparatuses are shown in block diagram form in order to avoid obscuring the concepts of the described examples.

The functions described herein may be implemented in hardware, software executed by a processor, firmware, or any combination thereof. If implemented in software executed by a processor, the functions may be stored on or transmitted over as one or more instructions or code on a (non-transitory) computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable medium as described herein may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

What is claimed is:

1. A method for decoding video data, the method comprising:
receiving an encoded bitstream having coded video data from which reconstructed video units are generated;
identifying multiple filter supports for each of the reconstructed video units, each of the multiple filter supports corresponding to a different filter shape, the multiple filter supports being identified from classifying multiple video blocks within one of the reconstructed video units, and classes in a classification of the multiple video blocks being based on a directionality obtained using a one-dimensional Laplacian to compute diagonal gradients and a quantized value of activity obtained using a two-dimensional Laplacian;
identifying a geometric transformation having a rotation; and
filtering each of the reconstructed video units using the multiple filter supports to produce a decoded video output, wherein the geometric transformation is applied to filter coefficients of a respective one of the multiple filter supports based on the directionality.

2. The method of claim 1, wherein each reconstructed video unit corresponds to a video slice, a video tile, a video picture, or a video frame.

3. The method of claim 1, wherein identifying the multiple filter supports for each of the reconstructed video units includes identifying, for a plurality of video blocks within one of the reconstructed video units, a unique filter support, and
wherein filtering each of the reconstructed video units includes filtering the plurality of video blocks within the one of the reconstructed video units using the unique filter support.

4. The method of claim 1, each class in the classification is associated with a unique filter support.

5. The method of claim 1, wherein identifying the multiple filter supports for each of the reconstructed video units includes identifying, for the multiple video blocks within one of the reconstructed video units, a different filter support, each different filter support for the multiple video blocks being associated with a respective directionality or a strong directionality, being based on information decoded from the one of the reconstructed video units, or a combination thereof.

6. The method of claim 5, wherein the information decoded from the one of the reconstructed video units includes one or more of:
intra-prediction direction information,
block partition size information, or
quantization parameter (QP) information.

7. The method of claim 1, further comprising receiving, along with the encoded bitstream having the coded video data and for each reconstructed video unit, an indication of a filter length to be similarly applied to all of the multiple filter supports.

8. The method of claim 1, further comprising receiving, along with the encoded bitstream having the coded video data and for each reconstructed video unit, one or more indications of filter length to be applied to each of the multiple filter supports.

9. The method of claim 1, further comprising:
receiving, along with the encoded bitstream having the coded video data and for each reconstructed video unit, an indication of each of the multiple filter supports,
wherein identifying the multiple filter supports for each of the reconstructed video units is based at least on the indication.

10. The method of claim 9, wherein each of the multiple filter supports is from a pre-defined group of filter supports selected through off-line training.

11. The method of claim 10, wherein each of the multiple filter supports is associated with one or more of the classes, one or more directionalities, or one or more strong directionalities.

12. The method of claim 10, wherein for the pre-defined group of filter supports, one of the multiple filter supports associated with the reconstructed video unit is different from another of the multiple filter supports associated with the reconstructed video unit.

13. The method of claim 10, further comprising receiving, for each of the multiple filter supports, an indication of a selected filter support from the pre-defined group.

14. The method of claim 1, wherein for each size of a video block in one of the reconstructed video units, the multiple filter supports are from a current group of filter supports being associated with a video block size, and the current group being dynamically updated based on selection frequency of each filter support in the current group.

15. The method of claim 1, wherein:
merging between different classes associated with the classification is applicable when a number of filter coefficients are a same number for each of two different filter supports associated with two different classes.

16. The method of claim 1, further comprising disabling predictive coding when a number of filter coefficients are different for each of two different filters associated with two different classes associated with the classification, disabling the predictive coding including disabling predictive coding of a first filter of the two different filters from a second filter of the two different filters.

17. The method of claim 1, wherein the rotation is a 45 degree rotation, and a same number of filter coefficients is associated with the geometric transformation having the 45 degree rotation and with other geometric transformations in a group of geometric transformations.

18. The method of claim 1, wherein the rotation is a 45 degree rotation, and further comprising disabling the geometric transformation having the 45 degree rotation when an associated directionality indicates that there is no direction.

19. The method of claim 1, wherein the classification is based at least in part on evaluating one or more of an energy of a current row, an energy of a current column, an energy of a neighboring row, or an energy of a neighboring column.

20. The method of claim 19, wherein the energy of the current row, the energy of the current column, the energy of the neighboring row, the energy of the neighboring column, is defined as:
a smoothness of the current row, the neighboring row, the current column, or the neighboring column, or
an average function of values of consecutive samples including a current pixel of the current row, the neighboring row, the current column, or the neighboring column.

21. The method of claim 1, wherein the classification of a video block of the multiple video blocks is based at least on an evaluation of energy when a directionality of the video block indicates that there is no direction.

22. The method of claim 1, wherein the classification is based at least in part on a value of a current pixel in a current video block of the multiple video blocks, and a value of neighboring pixels to the current pixel.

23. The method of claim 22, wherein the neighboring pixels include:
four neighboring pixels located above, left, below, and right of the current pixel,
a first set of pixels adjacent to the current pixel that have values greater than a value of the current pixel, or
a second set of pixels adjacent to the current pixel that have values smaller than the value of the current pixel.

24. The method of claim 1, wherein filtering each of the reconstructed video units using the multiple filter supports to produce the decoded video output includes filtering one or more of:
luma components of each reconstructed video unit,
first chroma components of each reconstructed video unit,
second chroma components of each reconstructed video unit,
the first chroma components and the second chroma components of each reconstructed video unit, or
a combination thereof.

25. The method of claim 1, the method being executable on a wireless communication device, wherein the wireless communication device comprises:
a memory configured to store the coded video data;
a processor configured to execute instructions to process the coded video data stored in the memory; and
a receiver configured to receive information representative of the encoded bitstream having the coded video data.

26. The method of claim 25, wherein the wireless communication device is a cellular telephone and the information representative of the encoded bitstream having the coded video data is received by the receiver and modulated according to a cellular communication standard.

27. A device for decoding video data, the device comprising:
a memory configured to store instructions; and
a processor configured to execute the instructions to:
receive an encoded bitstream having coded video data from which reconstructed video units are generated;
identify multiple filter supports for each of the reconstructed video units, each of the multiple filter supports corresponding to a different filter shape, the multiple filter supports being identified from a classification of multiple video blocks within one of the reconstructed video units, and classes in the classification of the multiple video blocks being based both on a directionality obtained using a one-dimensional Laplacian to compute diagonal gradients and a quantized value of activity obtained using a two-dimensional Laplacian;
identify a geometric transformation having a rotation; and
filter each of the reconstructed video units using the multiple filter supports to produce a decoded video output, including being configured to apply the geometric transformation to filter coefficients of a respective one of the multiple filter supports based on the directionality.

28. The device of claim 27, wherein each reconstructed video unit corresponds to a video slice, a video tile, a video picture, or a video frame.

29. The device of claim 27, wherein:
the processor, which is configured to execute the instructions to identify the multiple filter supports for each of the reconstructed video units, is further configured to execute the instructions to identify, for a plurality of video blocks within one of the reconstructed video units, a unique filter support, and
the processor, which is configured to execute the instructions to filter each of the reconstructed video units, is further configured to execute the instructions to filter the plurality of video blocks within the one of the reconstructed video units using the unique filter support.

30. The device of claim 27, wherein each class in the classification is associated with a unique filter support.

31. The device of claim 27, wherein the processor, which is configured to execute the instructions to identify the multiple filter supports for each of the reconstructed video units, is further configured to execute the instructions to identify, for multiples video blocks within one of the reconstructed video units, a different filter support, each different filter support for the multiple video blocks being associated with a respective directionality or a strong directionality, being based on information decoded from the one of the reconstructed video units, or a combination thereof.

32. The device of claim 27, wherein:
the processor, which is configured to execute the instructions to receive the encoded bitstream, is further configured to execute the instructions to receive, along with the encoded bitstream and for each reconstructed video unit, an indication of each of the multiple filter supports, and
the processor, which is configured to execute the instructions to identify the multiple filter supports for each of the reconstructed video units, is further configured to execute the instructions to identify the multiple filter supports based at least on the indication.

33. The device of claim 32, wherein:
each of the multiple filter supports is from a pre-defined group of filter supports selected through off-line training,
each of the multiple filter supports is associated with one or more classes, one or more directionalities, or one or more strong directionalities, or
a combination thereof.

34. The device of claim 27, wherein:
merging between different classes associated with the classification is applicable when a number of filter coefficients are a same number for each of two different filter supports associated with two different classes.

35. The device of claim 27, wherein the processor, which is configured to execute the instructions to identify the multiple filter supports for each of the reconstructed video units, is further configured to execute the instructions to classify the multiple video blocks within each reconstructed video unit based at least in part on evaluating one or more of an energy of a current row, an energy of a current column, an energy of a neighboring row, or an energy of a neighboring column.

36. The device of claim 27, wherein the processor, which is configured to execute the instructions to identify the multiple filter supports for each of the reconstructed video units, is further configured to execute the instructions to classify the multiple video blocks within each reconstructed video unit based at least in part on a value of a current pixel in a current video block of the multiple video blocks, and a value of neighboring pixels to the current pixel.

37. The device of claim 27, wherein the processor, which is configured to execute the instructions to filter each of the reconstructed video units using the multiple filter supports to produce the decoded video output, is further configured to execute the instructions to filter one or more of:
luma components of each reconstructed video unit,
first chroma components of each reconstructed video unit,
second chroma components of each reconstructed video unit,
the first chroma components and the second chroma components of each reconstructed video unit, or
a combination thereof.

38. The device of claim 27, wherein the device is a wireless communication device, further comprising:
a receiver configured to receive information representative of the encoded bitstream having the coded video data.

39. The device of claim 38, wherein the wireless communication device is a cellular telephone and the information is received by the receiver and modulated according to a cellular communication standard.

40. A method for encoding video data, the method comprising:
identifying multiple filter supports for each of multiple reconstructed video units, each of the multiple filter supports corresponding to a different filter shape, the multiple filter supports being identified from classifying multiple video blocks within one of the reconstructed video units, and classes in a classification of the multiple video blocks being based on a directionality obtained using a one-dimensional Laplacian to compute diagonal gradients and a quantized value of activity obtained using a two-dimensional Laplacian;
identifying a geometric transformation having a rotation;
filtering each of the reconstructed video units using the multiple filter supports to produce a decoded video output, wherein the geometric transformation is applied to filter coefficients of a respective one of the multiple filter supports based on the directionality; and
applying the decoded video output to a prediction process.

41. The method of claim 40, wherein each reconstructed video unit corresponds to a video slice, a video tile, a video picture, or a video frame.

42. The method of claim 40, wherein identifying the multiple filter supports for each of the reconstructed video units includes identifying, for a plurality of video blocks within one of the reconstructed video units, a unique filter support, and
wherein filtering each of the reconstructed video units includes filtering the plurality of video blocks within the one of the reconstructed video units using the unique filter support.

43. The method of claim 40, further comprising:
generating an indication of each of the multiple filter supports; and
transmitting, along with an encoded bitstream having coded video data, the indication.

44. The method of claim 40, wherein:
merging between different classes associated with the classification is applicable when a number of filter coefficients are a same number for each of two different filter supports associated with two different classes.

45. The method of claim 40, wherein the classification is based at least in part on evaluating one or more of an energy of a current row, an energy of a current column, an energy of a neighboring row, or an energy of a neighboring column.

46. The method of claim 40, wherein the classification is based at least in part on a value of a current pixel in a current video block of the multiple video blocks, and a value of neighboring pixels to the current pixel.

47. The method of claim 40, wherein filtering each of the reconstructed video units using the multiple filter supports to produce the decoded video output includes filtering one or more of:
luma components of each reconstructed video unit,
first chroma components of each reconstructed video unit,
second chroma components of each reconstructed video unit,
the first chroma components and the second chroma components of each reconstructed video unit, or
a combination thereof.

48. A device for encoding video data, the device comprising:
a memory configured to store instructions; and
a processor configured to execute the instructions to:
identify multiple filter supports for a plurality of reconstructed video units, each of the multiple filter supports corresponding to a different filter shape, the multiple filter supports being identified from a classification of multiple video blocks within one of the plurality of reconstructed video units, and classes in the classification of the multiple video blocks being based on a directionality obtained using a one-dimensional Laplacian to compute diagonal gradients and a quantized value of activity obtained using a two-dimensional Laplacian;
identify a geometric transformation having a rotation;
filter each of the plurality of reconstructed video units using the multiple filter supports to produce a decoded video output, including being configured to apply the geometric transformation to filter coefficients of a respective one of the multiple filter supports based on the directionality; and
apply the decoded video output to a prediction process.

49. The device of claim 48, wherein an individual reconstructed video unit of the plurality of reconstructed video units corresponds to a video slice, a video tile, a video picture, or a video frame.

50. The device of claim 48, wherein:
the processor, which is configured to execute the instructions to identify the multiple filter supports for each of the plurality of reconstructed video units, is further configured to execute the instructions to identify, for a plurality of video blocks within one of the reconstructed video units, a unique filter support, and
the processor, which is configured to execute the instructions to filter each of the reconstructed video units, is further configured to execute the instructions to filter the plurality of video blocks within the one of the reconstructed video units using the unique filter support.

51. The device of claim 48, wherein the processor is further configured to execute the instructions to:
generate an indication of each of the multiple filter supports; and
transmitting, along with an encoded bitstream having coded video data, the indication.

52. The device of claim 48, wherein the processor, which is configured to execute the instructions to identify the multiple filter supports for each of the reconstructed video units, is further configured to execute the instructions to classify the multiple video blocks within each reconstructed video unit based at least in part on evaluating one or more of an energy of a current row, an energy of a current column, an energy of a neighboring row, or an energy of a neighboring column.

53. The device of claim 48, wherein the processor, which is configured to execute the instructions to identify the multiple filter supports for each of the reconstructed video units, is further configured to execute the instructions to classify the multiple video blocks within each reconstructed video unit based at least in part on a value of a current pixel in a current video block of the multiple video blocks, and a value of neighboring pixels to the current pixel.

54. The device of claim 48, wherein the processor, which is configured to execute the instructions to filter each of the reconstructed video units using the multiple filter supports to produce the decoded video output, is further configured to execute the instructions to filter one or more of:
 luma components of each reconstructed video unit,
 first chroma components of each reconstructed video unit,
 second chroma components of each reconstructed video unit,
 the first chroma components and the second chroma components of each reconstructed video unit, or
 a combination thereof.

55. The method of claim 40, wherein the rotation is a 45 degree rotation, and a same number of filter coefficients is associated with the geometric transformation having the 45 degree rotation and with other geometric transformations in a group of geometric transformations.

56. The method of claim 40, wherein the rotation is a 45 degree rotation, and further comprising disabling the geometric transformation having the 45 degree rotation when an associated directionality indicates that there is no direction.

57. The device of claim 27, wherein the rotation is a 45 degree rotation, and a same number of filter coefficients is associated with the geometric transformation having the 45 degree rotation and with other geometric transformations in a group of geometric transformations.

58. The device of claim 27, wherein the rotation is a 45 degree rotation, and the processor is further configured to execute the instructions to disable the geometric transformation having the 45 degree rotation when an associated directionality indicates that there is no direction.

* * * * *